(12) United States Patent
Kato et al.

(10) Patent No.: US 8,289,548 B2
(45) Date of Patent: Oct. 16, 2012

(54) PRINTER HAVING FIRST AND SECOND MEMORY REGIONS AND NON-TRANSITORY COMPUTER-READABLE RECORDING MEDIUM STORING CONTROL PROGRAM OF PRINTER

(75) Inventors: Takao Kato, Nagoya (JP); Naoki Tanjima, Nisshin (JP); Motonori Tanaka, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 840 days.

(21) Appl. No.: 12/378,554

(22) Filed: Feb. 17, 2009

(65) Prior Publication Data

US 2009/0213421 A1 Aug. 27, 2009

(30) Foreign Application Priority Data

Feb. 21, 2008 (JP) ................................. 2008-039983
Aug. 4, 2008 (JP) ................................. 2008-200650
Aug. 29, 2008 (JP) ................................. 2008-220797

(51) Int. Cl.
*G06F 3/12* (2006.01)
*G11C 11/22* (2006.01)
(52) U.S. Cl. ....................................... 358/1.15; 365/145
(58) Field of Classification Search ........................ None
See application file for complete search history.

(56) References Cited

U.S. PATENT DOCUMENTS

2004/0246762 A1* 12/2004 Inada ............................. 365/145
2006/0190941 A1 8/2006 Kobayashi et al.
2007/0109322 A1 5/2007 Miyata

FOREIGN PATENT DOCUMENTS

| EP | 1463289 A2 | 9/2004 |
| JP | 11007521 | 1/1999 |
| JP | 2004171536 a | 10/2003 |
| JP | 2004151785 | 5/2004 |
| JP | 2007140597 | 6/2007 |

* cited by examiner

*Primary Examiner* — Twyler Haskins
*Assistant Examiner* — Christopher D Wait
(74) *Attorney, Agent, or Firm* — McCarter & English, LLP

(57) ABSTRACT

A personal computer connected to a USB port of a printer through a management table managing writing on an ordinary storage region in FLASH ROM recognizes the ordinary storage region in the FLASH ROM of the printer as a removable drive which is a USB mass storage class device. Accordingly, an execution file of an application program stored in a portion of the ordinary storage region in the FLASH ROM can be read with a usual access from the personal computer, enabling the application program to be executed without being installed. When the application program is executed on the personal computer, periodic accesses are made to the ordinary storage region of the printer, and when an access fails, the application program is terminated.

8 Claims, 14 Drawing Sheets

PRINTER HAVING FIRST AND SECOND MEMORY REGIONS AND NON-TRANSITORY COMPUTER-READABLE RECORDING MEDIUM STORING CONTROL PROGRAM OF PRINTER

CROSS-REFERENCE TO RELATED APPLICATIONS

This application claims priority from the prior Japanese Patent Application No. 2008-039983 filed on Feb. 21, 2008, the prior Japanese Patent Application No. 2008-200650 filed on Aug. 4, 2008 and the prior Japanese Patent Application No. 2008-220797 filed on Aug. 29, 2008, the contents of which are hereby incorporated by reference in their entirety.

TECHNICAL FIELD

The disclosure relates to a printer to be connected to a host by way of USB.

BACKGROUND

Conventionally, when using a printer connected to a personal computer, an editor installed in the personal computer is used for creating edited data to be printed at the printer.

The device driver of the printer is installed in the personal computer, being interposed between the editor of the personal computer and the printer. The device driver outputs the edited data created by the editor of the personal computer to the printer while converting the edited data into a data format suited to the printer, which is the output destination. As a result, the edited data created by the editor of the personal computer can be printed by the printer (see, for example, Japanese Patent Application Laid-Open No. 2007-140597).

Accordingly, for example, in case a special editor for the easy use of the variety of functions of the printer is provided as an application program, the special editor needs to be installed to the personal computer for the utilization of the special editor.

In addition, in case a special device driver is provided, the special device driver needs to be installed to the personal computer similarly.

On the other hand, recently, the concern about security has been heightening, an administrator is assigned for each information system, and software cannot be installed in a personal computer in many cases without permission of the administrator. Under such a situation like this where installing software to a personal computer is not casually done, if the special editor and the special device driver is not already installed in a personal computer, there will be a lot of troublesome work to print a material utilizing the variety of functions of the printer, even if the material is the data edited at the personal computer itself.

In particular, if the printer is of a portable type, its features are sacrificed, and such a situation is giving a bad impression to users in the present market filled with user-friendly products.

SUMMARY

The present disclosure is made, in light of the above point, for providing a printer which allows printing while utilizing an application program from a host even if the application program and a device driver are not installed.

In addition to the above, this disclosure is made for providing a printer which can prevent the application program from operating if there is no guarantee of proper operations of the application program, and also, which allows print data immediately before a power-off to be reconstructed when resuming the application program even if the power is automatically turned off while printing the print data utilizing the application program.

To achieve the object of the disclosure, there is provided a printer comprising: a USB port; a memory comprising an ordinary storage region; a management table arranged outside the ordinary storage region of the memory, the management table for making a personal computer connected to the USB port recognize the ordinary storage region in the memory as a removable drive while managing an access to the ordinary storage region in the memory; a first memory region being a portion of the ordinary storage region in the memory assigned by the management table and storing an execution file of an application program therein; a second memory region being a portion of the ordinary storage region in the memory assigned by the management table and having a command file capable of including print data created by the application program written therein; a printing device executing printing based on the print data in the command file written in the second memory region; and a processor controlling the printing device and the memory, wherein, the processor executes processes of: (a) renewing the command file in the second memory region with a command file received; and (b) analyzing the command file currently renewed and taking out the print data.

Furthermore, according to another aspect, there is provided a computer-readable recording medium storing a control program of a printer, wherein, the printer comprising: a USB port; the recording medium; an ordinary storage region arranged in the recording medium; a management table arranged outside the ordinary storage region of the recording medium, the management table for making a personal computer connected to the USB port recognize the ordinary storage region in the recording medium as a removable drive while managing an access to the ordinary storage region in the recording medium; a first memory region being a portion of the ordinary storage region in the recording medium assigned by the management table and storing an execution file of an application program therein; a second memory region being a portion of the ordinary storage region in the recording medium assigned by the management table and having a command file capable of including print data created by the application program written therein; a printing device executing printing based on the print data in the command file written in the second memory region; and a processor accessing the recording medium and controlling the printing device; wherein, the control program including following instructions: (a) instruction of renewing the command file in the second memory region with a command file received; and (b) instruction of analyzing the command file currently renewed and taking out the print data.

DETAILED DESCRIPTION

A detailed description of an exemplary embodiment of a printer according to the disclosure will now be given referring to the accompanying drawings.

[1-1 System Configuration of the First Embodiment]

Figure 2:
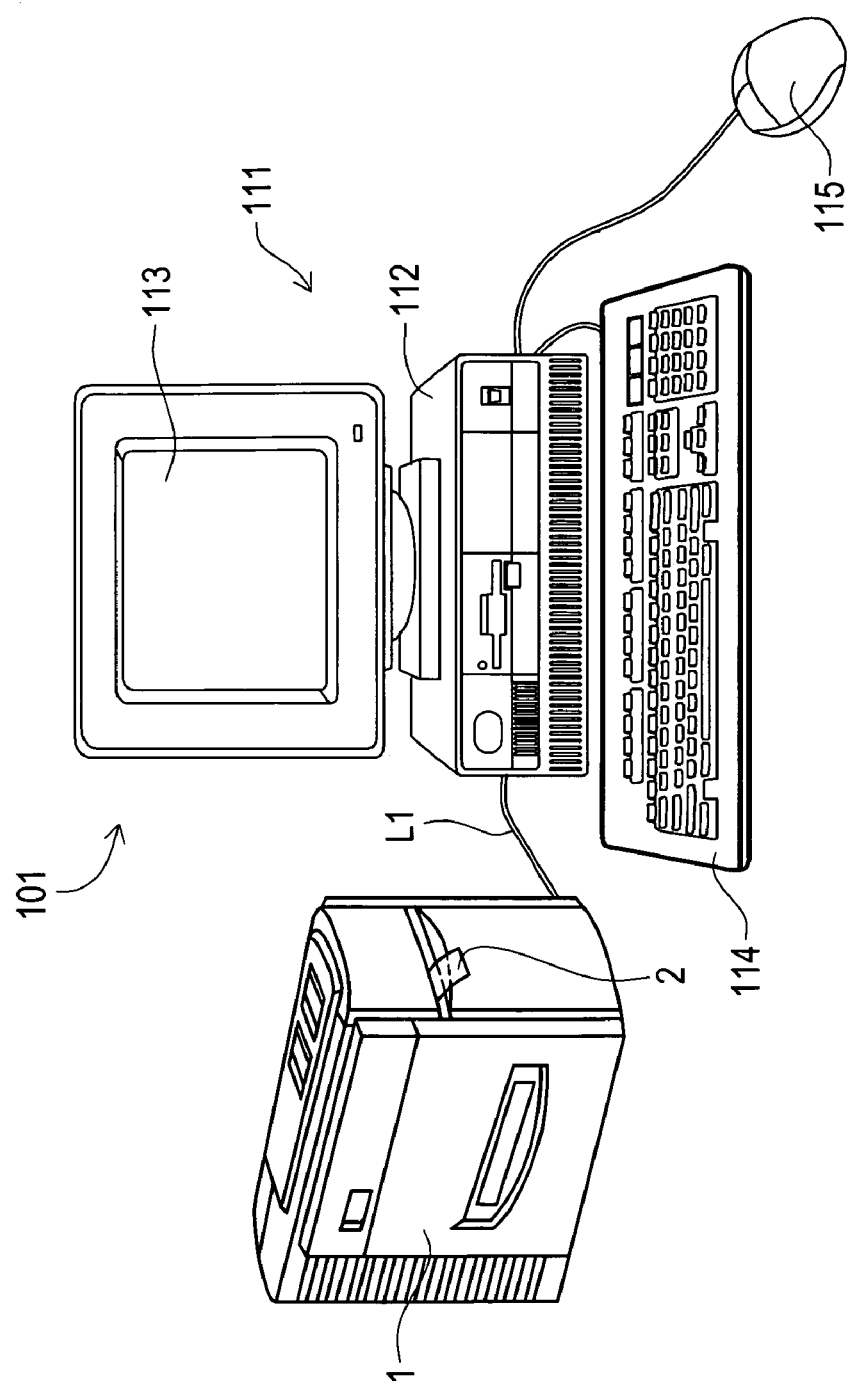
FIG. 2 is a view showing the printer connected to the personal computer.

The first embodiment of the disclosure is described below with reference to the accompanying drawings. FIG. 2 shows a printer 1 of the first embodiment of the disclosure connected to a personal computer 111. As shown in FIG. 2, the printer 1 of the first embodiment is configured by being connected to the personal computer 111 by way of a USB cable L1. Thereby the printing system 101 is constituted. In this regard, the printer 1 of the first embodiment is what is called a label printer for printing on a printing tape 2. The printer 1 of the first embodiment is such a compact size as to be placed on an office desk or the like and thus being portable. The personal computer 111 is a host of the printing system 101, and is a desktop computer including a main body 112, a display 113, a keyboard 114, a mouse 115, and others.

[1-2 Internal Configuration of the First Embodiment]

Figure 3:
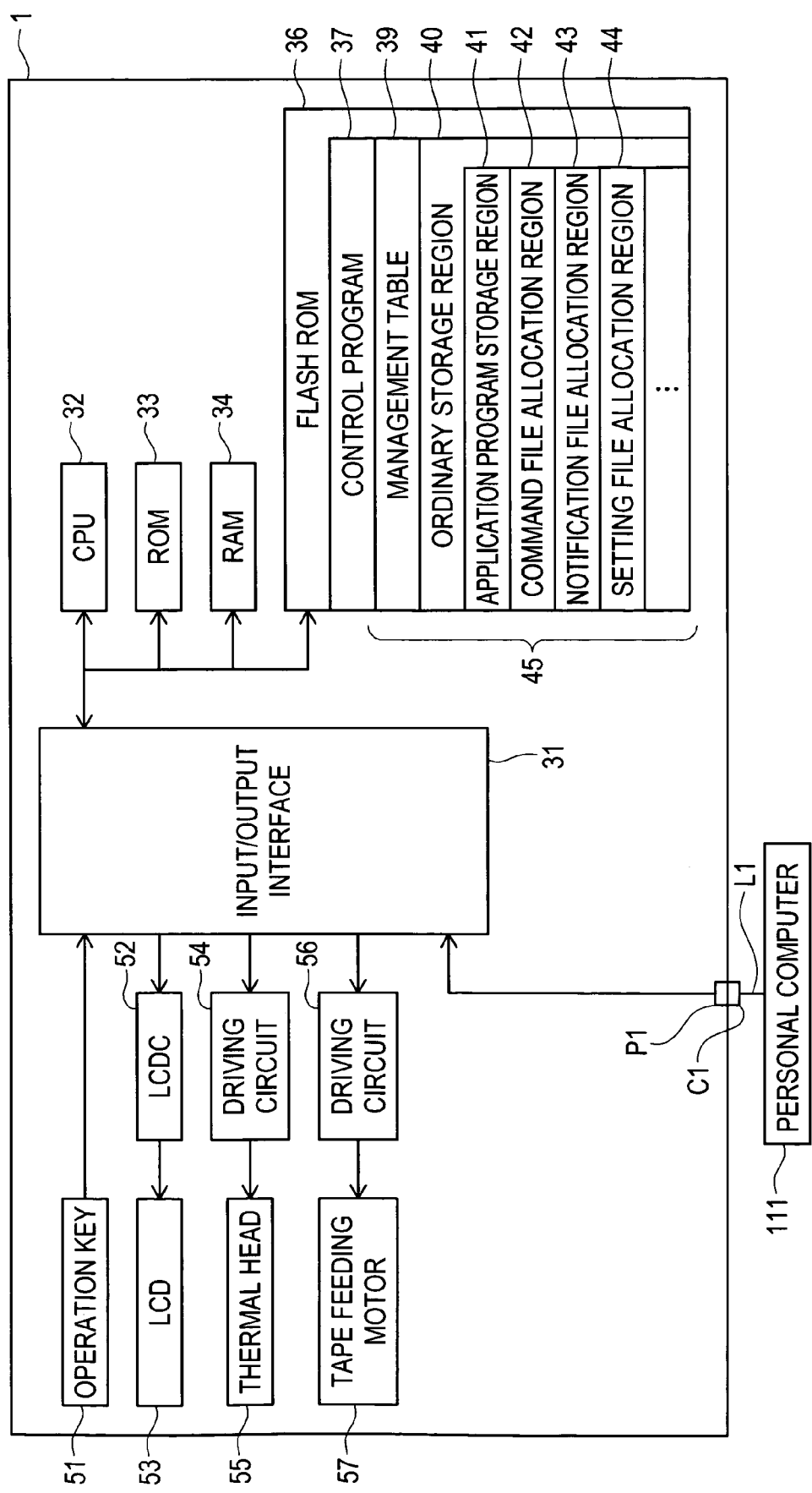
FIG. 3 is a block diagram showing an internal configuration of the printer.

The internal configuration of the printer 1 of the first embodiment is described with reference to FIG. 3. FIG. 3 is a block diagram showing the internal configuration of the printer 1 of the first embodiment.

As shown in FIG. 3, the printer 1 of the first embodiment includes an operation key 51, a display controller (hereinafter, referred to as a LCDC) 52, two driving circuits 54 and 56, a USB port P1, and others connected to an input/output interface 31.

The operation key 51 is operated by a user to input control signals for causing various desired operations to a CPU 32. The LCDC 52 has a LCD 53 connected thereto, and this LCD 53 is provided with a display RAM for displaying display data. The driving circuit 54 is connected to a thermal head 55, and drives the thermal head 55 when printing print data on a printing tape 2. The driving circuit 56 is connected to a tape feeding motor 57, and drives this tape feeding motor 57 when discharging the printing tape 2 to the outside.

A connector C1 of the USB cable L1 is attached to and detached from the USB port P1. When the connector C1 of the USB cable L1 is inserted into this USB port P1, the personal computer 111 can be connected to the printer 1 of the first embodiment by USB connection.

In the printer 1 of the first embodiment, the CPU 32, a ROM 33, a RAM 34, a FLASH ROM 36 and others are connected to the input/output interface 31.

The CPU 32 is for executing programs and others to be later described, and includes a built-in cache memory and others in which control programs other than those for printing are stored.

By executing a control program 37 to be later described, the CPU 32 can operate the driving circuits 54 and 56 to discharge the printing tape 2 to the outside while printing on the printing tape 2 the print data stored in an ordinary storage region 40 to be later described. The two driving circuits 54 and 56, the thermal head 55, the tape feeding motor 57 and others constitute "a printing device".

The ROM 33 stores control programs other than those for printing. The RAM 34 provides a working region when executing various control programs by the CPU 32.

The FLASH ROM 36 stores the control program 37 relating to printing, a management table 39 and others, and is further provided with the ordinary storage region 40 and others. In addition, the ordinary storage region 40 is provided with an application program storage region 41, a command file allocation region 42, a notification file allocation region 43, a setting file allocation region 44 and others.

The management table 39 manages the writing into the ordinary storage region 40 in the FLASH ROM 36 by a USB standard, and causes the personal computer 111 connected to the USB port P1 to recognize the ordinary storage region 40 in the FLASH ROM 36 as a removable drive.

Figure 1:
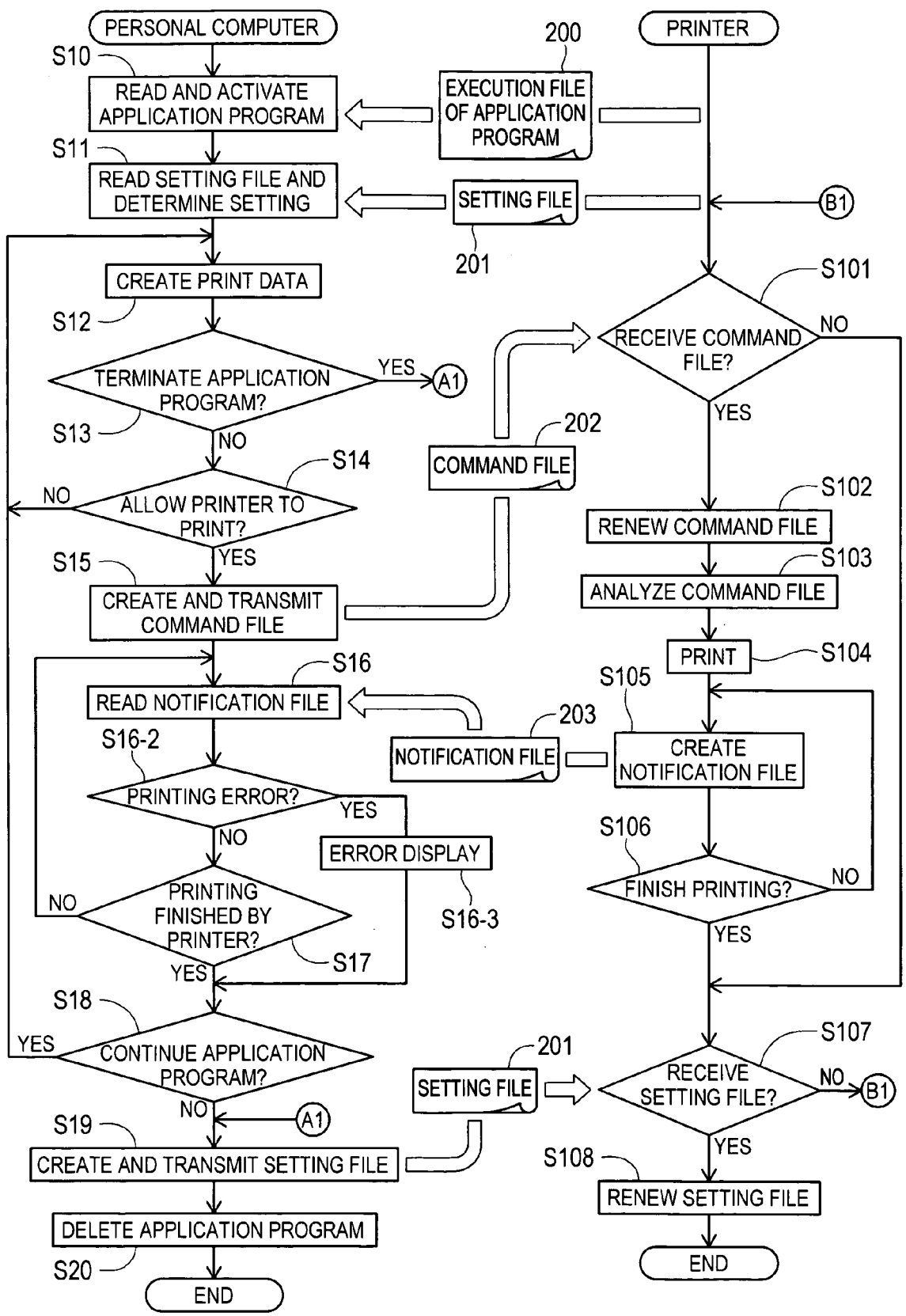
FIG. 1 is a flowchart illustrating a program controlling operations of a printer of the first embodiment in accordance with operations of a personal computer.

The application program storage region 41 is a portion of the ordinary storage region 40 in the FLASH ROM 36 fixedly assigned, storing an execution file 200 of an application program (see FIG. 1 to be later described). The application program here indicates software developed as a special editor for the printer 1 according to the first embodiment.

The command file allocation region 42 is a portion of the ordinary storage region 40 in the FLASH ROM 36 assigned by the management table 39, storing a command file 202 (see FIG. 1 to be later described). The command file 202 (see FIG. 1 to be later described) here is created by the above application program, includes a print command, and further, includes print data created by the above application program.

The notification file allocation region 43 is a portion of the ordinary storage region 40 in the FLASH ROM 36 assigned by the management table 39, storing a notification file 203 (see FIG. 1 to be later described). The notification file 203 (see FIG. 1 to be later described) includes status information of the printer 1 of the first embodiment.

The setting file allocation region 44 is a portion of the ordinary storage region 40 in the FLASH ROM 36 assigned by the management table 39, storing a setting file 201 (see FIG. 1 to be later described). The setting file 201 (see FIG. 1 to be later described) is created by the above application program and includes setting information showing the usage environment set by the user in the above application program.

Therefore, in the FLASH ROM 36, the management table 39 and the ordinary storage region 40 function as a mass storage area 45 of the USB standard.

[1-3 Operation of the First Embodiment]

Next, operations of the printer 1 of the first embodiment will now be described referring to FIG. 1. FIG. 1 is a flowchart illustrating a program controlling operations of the printer 1 of the first embodiment in accordance with operations of the personal computer 111. First, the operations of the personal computer 111 will be described.

As described above, when USB-connected to the printer 1 of the first embodiment, the personal computer 111 recognizes the ordinary storage region 40 in the FLASH ROM 36 of the printer 1 of the first embodiment as a removable drive.

Then, in the personal computer 111 at S10, a user accesses, by a usual operation, the application program storage region 41, which is an assigned portion of the ordinary storage region 40 in the FLASH ROM 36 of the printer 1 of the first embodiment, and the execution file 200 of the application program stored in the application program storage region 41 is read and activated.

Further, at S11, in the personal computer 111, the following operation is executed by the application program. That is, the setting file 201 is read from the setting file allocation region 44 which is an assigned portion of the ordinary storage region 40 in the FLASH ROM 36 of the printer 1 of the first embodiment. The usage environment, etc. of the application program are set based on the setting information of the application program included in the read setting file 201.

In the personal computer 111, at S12, the user creates print data to be printed at the printer 1 of the first embodiment, using the special editor which is the application program.

At S13, the personal computer 111 determines whether to terminate the application program or not. This determination is done based on an input of the user at the application program. Here, if it is determined to terminate the application program (S13: YES), the process shifts to S19 to be later described. If it is determined to continue the application program (S13: NO), the process shifts to S14.

At S14, the personal computer 111 determines whether to allow the printer 1 of the first embodiment to print or not. This determination is also done based on an input of the user at the application program. Here, if it is determined not to allow the printer 1 of the first embodiment to print yet (S14: NO), the process returns to the above S12. If it is determined to allow the printer 1 of the first embodiment to print (S14: YES), the process shifts to S15.

At S15, the personal computer 111 executes the following operations by the application program. That is, the personal computer 111 creates the command file 202 which includes a print command to the printer 1 of the first embodiment, print data created by the application program, etc. Further, the personal computer 111 transmits the created command file 202 to the printer 1 of the first embodiment.

At S16, the personal computer 111 executes the following operation by the application program. That is, the personal computer 111 reads the notification file 203 from the notification file allocation region 43 which is an assigned portion of the ordinary storage region 40 in the FLASH ROM 36 of the printer 1 of the first embodiment. Then the process shifts to S16-2.

At S16-2, it is determined whether the notification file 203 includes status information of a printing error or not. Here, if the status information of the printing error is included in the notification file 203 (S16-2: YES), the process shifts to S16-3. At S16-3, the printing error is displayed at LCD 53. After that, the process shifts to S18 below.

If the notification file 203 includes no status information of a printing error (S16-2: NO), the process shifts to S17.

At S17, the personal computer 111 executes the following operation by the application program. That is, the personal computer 111 determines whether or not the printer 1 of the first embodiment has finished printing the print data included in the command file 202 transmitted at the above S15. This determination is done based on the status of the printer 1 of the first embodiment detected from the status information included in the notification file 203 which is read at the above S16. Here, if the printing has not been finished (S17: NO), the process returns to the above S16. If the printing has been finished (S17: YES), the process shifts to S18.

At S18, the personal computer 111 determines whether to continue the application program or not. This determination is done based on an input by the user at the application program. Here, if it is determined to continue the application program (S18: YES), the process returns to the above S12. If it is determined to terminate the application program (S18: NO), the process shifts to S19.

At S19, the personal computer 111 executes the following operations by the application program. That is, the personal computer 111 creates the setting file 201 which includes setting information showing the usage environment of the application set by the user while the application is activated, etc. Further, the personal computer 111 transmits the created setting file 201 to the printer 1 of the first embodiment.

At S20, the personal computer 111 terminates the application program, and deletes the application program. As a result, the application program does not remain in the personal computer 111.

Meanwhile, a program controlling the operations of S101 to S108 is executed at the printer 1 of the first embodiment when USB-connected to the personal computer 111. The program is stored in the ROM 33, and the CPU 32 reads the program into a cache memory therein to execute.

First, at S101, the CPU 32 determines whether or not the command file 202 is received from the personal computer 111. Here, if the command file 202 has not been received from the personal computer 111 (S101: NO), the process shifts to S107 to be later described. If the command file 202 has been received from the personal computer 111 (S101: YES), the process shifts to S102.

At S102, the CPU 32 overwrites and stores the command file 202 onto the command file allocation region 42 which is an assigned portion of the ordinary storage region 40 in the FLASH ROM 36.

At S103, the CPU 32 analyzes the command file 202 overwritten on the command file allocation region 42 which is an assigned portion of the ordinary storage region 40 in the FLASH ROM 36. The print data included in the command file 202 is taken out by this analysis.

At S104, the CPU 32 executes printing of the print data taken out from the command file 202 at the above S103 in accordance with the control program 37 relating to printing stored in the FLASH ROM 36. Here, the CPU 32 activates the driving circuits 54, 56 and others.

At S105, the CPU 32 creates the notification file 203 which includes status information showing the current printing status and overwrites and stores the created notification file 203 on the notification file allocation region 43 which is an assigned portion of the ordinary storage region 40 in the FLASH ROM 36.

At S106, the CPU 32 determines whether the printing is finished or not. Here, if the printing is not yet finished (S106: NO), the process shifts to the above S105. If the printing is finished (S106: YES), the process shifts to S107.

At S107, the CPU 32 determines whether the setting file 201 is received or not from the personal computer 111. Here, if the setting file 201 has not been received from the personal computer 111 (S107: NO), the process returns to the above S101. If the setting file 201 has been received from the personal computer 111 (S107: YES), the process shifts to S108.

At S108, the CPU 32 overwrites and stores the setting file 201 on the setting file allocation region 44 which is an assigned portion of the ordinary storage region 40 in the FLASH ROM 36. After that, the CPU 32 terminates the present program.

[1-4 Summary]

As described above in detail, in the printer 1 of the first embodiment, the management table 39 which manages, with the USB standard, the writing into the ordinary storage region 40 in the FLASH ROM 36 is arranged outside the ordinary storage region 40 in the FLASH ROM 36 as shown in FIG. 3. With the management table 39, the personal computer 111 connected to the USB port P1 recognizes the printer 1 of the first embodiment (specifically, the ordinary storage region 40 in the FLASH ROM 36 of the printer 1 of the first embodiment) as a removable drive which is a USB mass storage class device.

Accordingly, with a usual access operation by a user at the personal computer 111, the personal computer 111 can read the execution file 200 of the application program stored in the application program storage region 41 which is a portion of the ordinary storage region 40 in the FLASH ROM 36 (S10). This enables execution of the application program at the personal computer 111 without installing the application program into the personal computer 111 (S10).

After that, the application program creates a command file 202 which can include print data created by the application program on the personal computer 111. The command file 202 is then written onto the command file allocation region 42 which is a portion of the ordinary storage region 40 in the FLASH ROM 36 with a usual access from the personal computer 111 (S15, S102).

The CPU 32 in turn takes out the print data in the command file 202 written on the command file allocation region 42 which is a portion of the ordinary storage region 40 in the FLASH ROM 36. The CPU 32 discharges the print tape 2 to the outside while printing the print data onto the print tape 2 by activating the driving circuits 54, 56, etc. (S104).

Here, upon receiving from the personal computer 111 the command file 202 which can include print data created by the application program on the personal computer 111 (S101: YES), the CPU 32 overwrites the command file 202 onto the command file allocation region 42 which is a portion of the ordinary storage region 40 in the FLASH ROM 36 and renews it (S102), then analyzes the renewed command file 202 and takes out the print data (S103). Accordingly, printing, using an application program can be carried out from the personal computer 111 even if the application program and a device driver are not installed in the personal computer 111.

Moreover, in the printer 1 of the first embodiment, the overwriting and renewal of the command file 202 onto the command file allocation region 42 which is a portion of the ordinary storage region 40 in the FLASH ROM 36 (S102) triggers the CPU 32 to analyze the renewed command file 202 and to take out the print data (S103).

However, the trigger may be the writing of the command file 202 received from the personal computer 111 onto any of the regions which are the portions of the ordinary storage region 40 in the FLASH ROM 36 for renewal of the command file 202 in the command file allocation region 42 which is a portion of the ordinary storage region 40 in the FLASH ROM 36.

Moreover, in the printer 1 of the first embodiment, the notification file allocation region 43 is assigned on a portion of the ordinary storage region 40 in the FLASH ROM 36 of the printer 1 of the first embodiment which is recognized by the personal computer 111 as a removable drive which is a USB mass storage class device. The notification file 203 including therein the status information of the printer 1 of the first embodiment is written on the notification file allocation region 43. Accordingly, the personal computer 111 can read the notification file 203 written on the notification file allocation region 43 which is a portion of the ordinary storage region 40 in the FLASH ROM 36 with a usual access from the personal computer 111 (S16). The personal computer 111 is thus notified of the operational status of the printer 1 of the first embodiment.

Further, in the printer 1 of the first embodiment, the setting file allocation region 44 is assigned on a portion of the ordinary storage region 40 in the FLASH ROM 36 of the printer 1 of the first embodiment which is recognized by the personal computer 111 as a removable drive which is a USB mass storage class device. The setting file 201 including therein the setting information showing the usage environment etc. of the application set by the user while the application is activated is written on the setting file allocation region 44. Accordingly, the setting information of the application program set at the personal computer 111 is written on the setting file allocation region 44 which is a portion of the ordinary storage region 40 in the FLASH ROM 36 with a usual access from the personal computer 111 (S19, S108). Thus, even if a different personal computer 111 replaces the current personal computer 111 being USB-connected to the printer 1 of the first embodiment, the different personal computer 111 can read the setting information of the application program written on the setting file allocation region 44 which is a portion of the ordinary storage region 40 in the FLASH ROM 36 with a usual access from the different personal computer 111 (S10). Therefore the usability is maintained of the application program to be executed on the different personal computer 111.

[1-5 Others]

The disclosure is not limited to the foregoing embodiment alone, but may be changed and modified within a scope not departing from the true spirit thereof.

For example, the printer 1 of the first embodiment is what is called a label printer for printing on the printing tape 2, but it may also be substituted by a printer for printing on roll or sheet printing paper.

The personal computer 111 connected to the printer 1 of the first embodiment by way of the USB port P1 is not particularly specified, and may include a tower type, an all-in-one type, a notebook type personal computer or a huge computer, or it may be connected to another personal computer by LAN or the like.

[1-6 Specification File]

Figure 4:
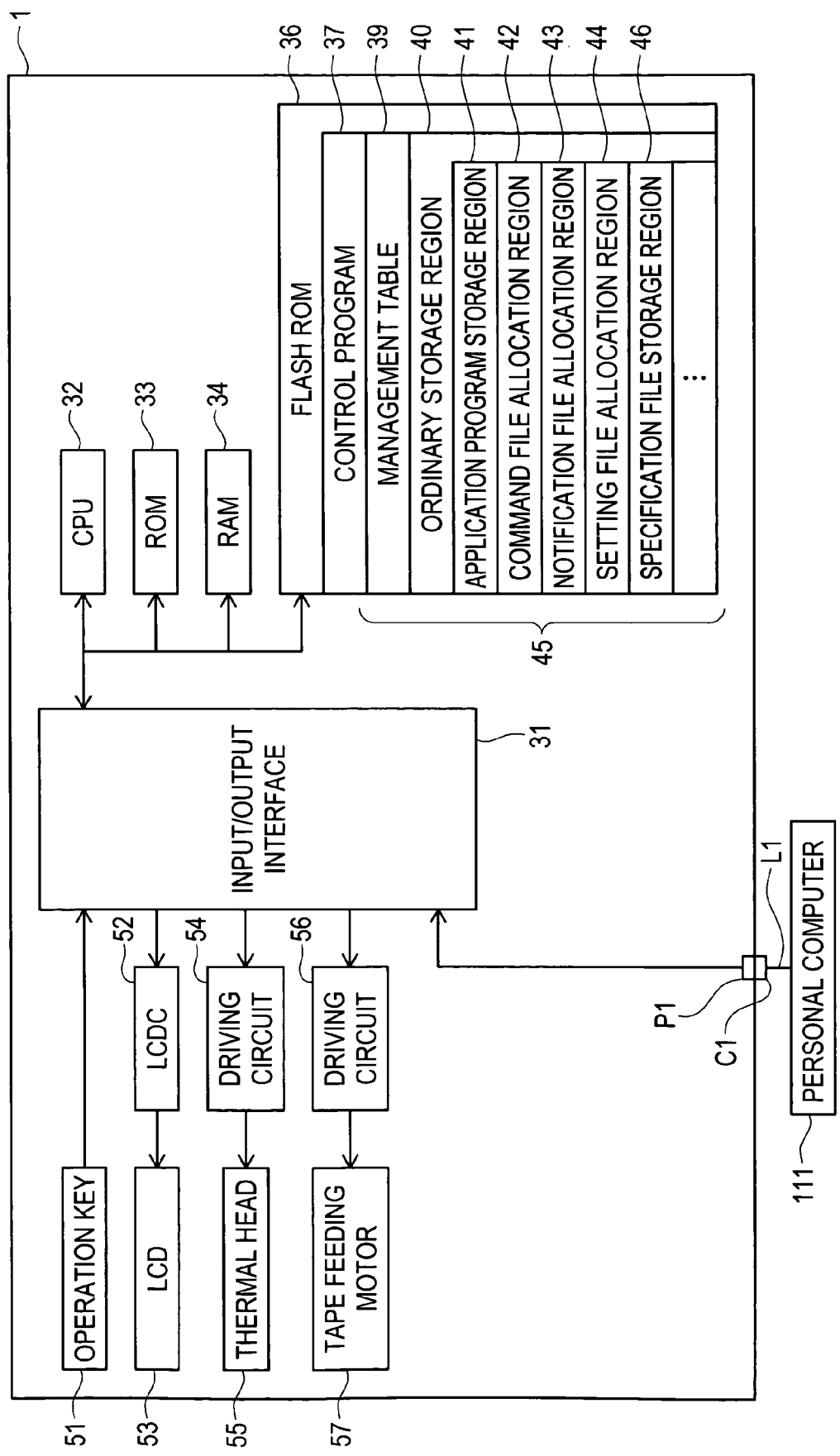
FIG. 4 is a block diagram showing another internal configuration of the printer.

As shown in the block diagram of FIG. 4, a specification file storage region 46 may newly be provided. The specification file storage region 46 is a portion of the ordinary storage region 40 in the FLASH ROM 36 assigned by the management table 39, and a specification file 204 (see FIG. 5 to be later described) is stored therein. The specification file 204 (see FIG. 5 to be later described) is used at the above application program, and includes specification information related to the major specifications of the printer 1 (for example, the types of printable tape widths of print tape 2).

Figure 5:
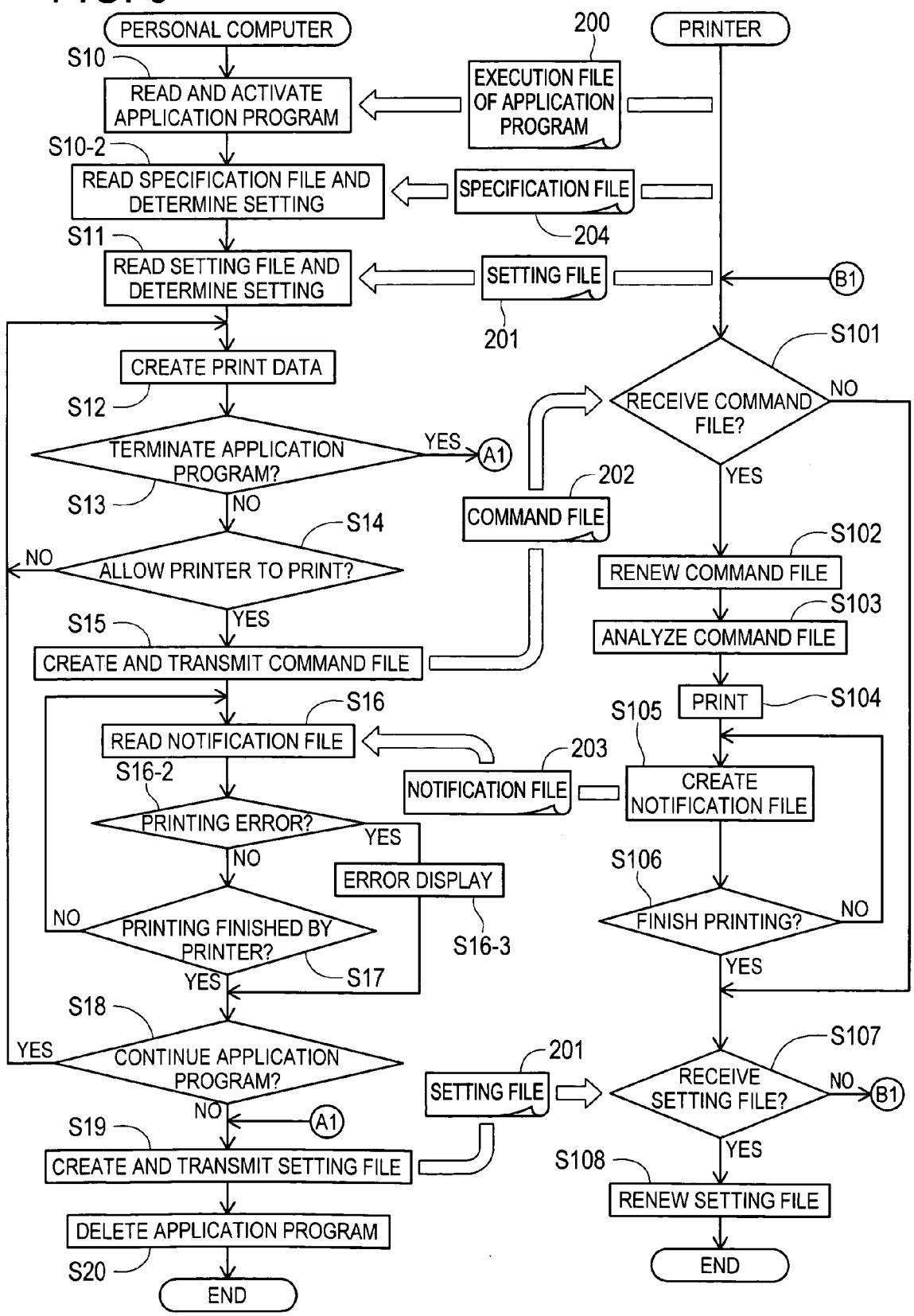
FIG. 5 is a flowchart illustrating a program controlling operations of the printer in accordance with operations of the personal computer.

The operations of the printer 1 of the first embodiment in such a case will now be described referring to FIG. 5. FIG. 5 is the same flow chart as the above FIG. 1 except the following descriptions.

At S10-2, the personal computer 111 executes the following operations with the application program. That is, the personal computer 111 reads the specification file 204 from the specification storage region 46 which is an assigned portion of the ordinary storage region 40 in the FLASH ROM 36 of the printer 1 of the first embodiment. Then, the personal computer 111 sets (changes) a user interface, etc. of the application program according to the specification information of the printer 1 included in the read specification file 204.

Figure 6:
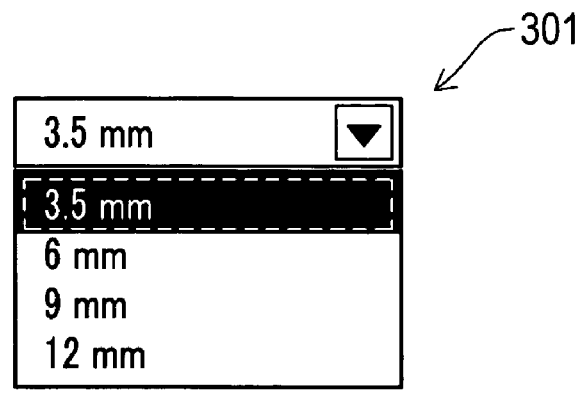
FIG. 6 is a view showing a combo box used at a special editor of the printer.

Accordingly, if the specification file 204 includes, for example, information related to four types of the printable tape widths of print tape 2 (3.5 mm, 6 mm, 9 mm and 12 mm), a combo box 301 shown in FIG. 6 is displayed on the display 113 of the personal computer 111 as a user interface of the application program. The user can choose one among the four types of the printable tape widths of print tape 2, that is, 3.5 mm, 6 mm, 9 mm and 12 mm, at the combo box 301.

Figure 7:
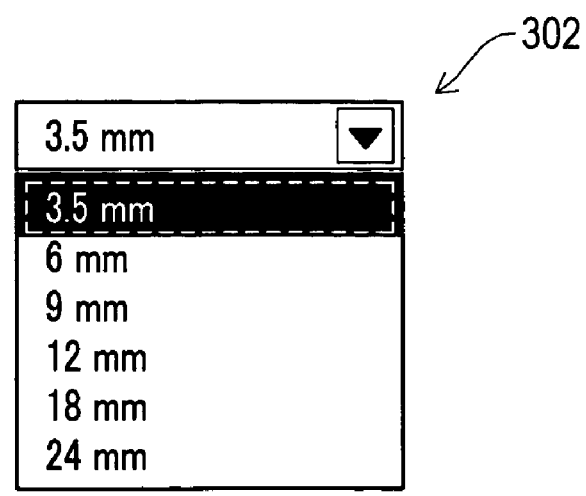
FIG. 7 is a view showing another combo box used at the special editor of the printer.

Meanwhile, if the specification file 204 includes, for example, information related to six types of the printable tape widths of print tape 2 (3.5 mm, 6 mm, 9 mm, 12 mm, 18 mm and 24 mm), a combo box 302 shown in FIG. 7 is displayed on the display 113 of the personal computer 111 as a user interface of the application program. The user can choose one among the six types of the printable tape widths of print tape 2, that is, 3.5 mm, 6 mm, 9 mm, 12 mm, 18 mm and 24 mm, at the combo box 302.

As above mentioned, in the first embodiment, if the printer 1 is USB-connected to the personal computer 111, the personal computer 111 recognizes the ordinary storage region 40 in the FLASH ROM 36 of the printer 1 as a removable drive which is a USB mass storage class device. Here, the specification file storage region 46 is a portion of the ordinary storage region 40 in the FLASH ROM 36 of the printer 1 of the first embodiment. Further, the specification file storage region 46 stores the specification file 204 which includes the specification information related to the specifications of the printer 1 (for example, the types of printable tape widths of print tape 2) used at the execution file 200 of the application program.

Accordingly, the personal computer 111 reads the specification file 204 stored in the specification file storage region 46 which is a portion of the ordinary storage region 40 in the FLASH ROM 36 with a usual access from the personal computer 111. Then the specification file 204 is used at the execution file 200 of the application program (S10-2). As a result, at the execution file 200 of the application program, the personal computer 111 sets (changes) a user interface, etc. of the application program in accordance with the specification file 204 including the specifications of the printer 1 (for example, the types of printable tape widths of print tape 2) therein.

Even if there are plural printers 1 of the first embodiment with different specifications, the usability becomes always appropriate of the application program executed on the personal computer 111, because, for example, through the setting (changing) of the user interface, etc. like using the combo boxes 301, 302 displayed on the display 113 of the personal computer 111, the behavior of the application program executed on the personal computer 111 can be adjusted to a certain specification of the printer 1 of the first embodiment which is USB-connected to the personal computer 111.

Further, the execution file 200 of the application program and the specification file 204 used by the application program are separately provided for the printer 1 of the first embodiment. Here, the specification file 204 includes, as above mentioned, specification information related to the main specifications of the printer 1 (for example, the types of printable tape widths of print tape 2, etc.) therein. Accordingly, the execution file 200 of the application program to be used here is created for general purposes. Thus, when plural printers 1 of the first embodiment each with different specifications are offered, the specification file 204 can correspond to any printer 1 of each specification through only replacing the specification file 204 stored in the specification file storage region 46 in the FLASH ROM 36 to the appropriate one for each specification. This is convenient also for the offering side itself.

In addition, the specification information of the printer 1 may be information other than the types of printable tape widths of print tape 2. For example, the specification information may be the types of print options (such as tape lengths of print tape 2 operable in one print, types of print tape 2 of default setting, possible number of copies, etc.), printable resolution, a flag for determining special button display, and so forth.

Further, the specification information of the printer 1 may be included in the setting file 201 or the notification file 203. In both cases, the specification information of the printer 1 can be read by the personal computer 111 with a usual access from the personal computer 111, and can be used at the execution file 200 of the application program (S11 or S16).

The specification file 204 may be read together with the setting file 201 or the notification file 203 when the setting file 201 or the notification file 203 is read by the personal computer 111 with a usual access from the personal computer 111 (S11 or S16). Alternatively, the specification file 204 may be read by the personal computer 111 when a trouble occurs in the application program executed on the personal computer 111.

[2-1 System Configuration of the Second Embodiment]

Figure 9:
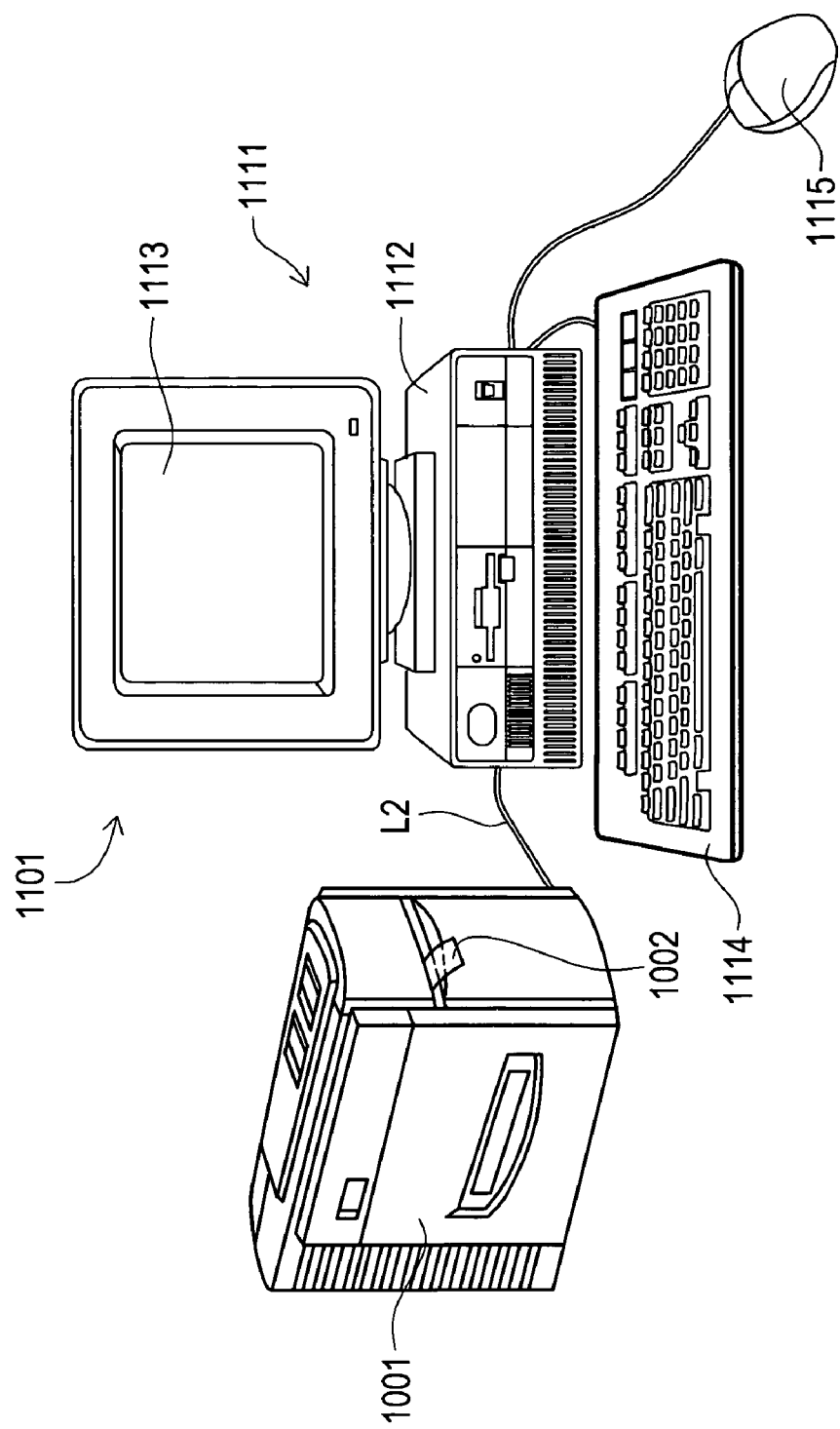
FIG. 9 is a view showing the printer connected to the personal computer.

The second embodiment of the disclosure is described below with reference to the accompanying drawings. FIG. 9 shows a printer 1001 of the second embodiment of the disclosure connected to a personal computer 1111 (corresponding to "PC"). As shown in FIG. 9, the printer 1001 of the second embodiment is configured by being connected to the personal computer 1111 by way of a USB cable L2. Thereby the printing system 1101 is constituted. In this regard, the printer 1001 of the second embodiment is what is called a label printer for printing on a printing tape 1002. The printer 1001 of the second embodiment is such a compact size as to be placed on an office desk or the like and thus being portable. The personal computer 1111 is a host of the printing system 1101, and is a desktop computer including a main body 1112, a display 1113, a keyboard 1114, a mouse 1115, and others.

Figure 10:
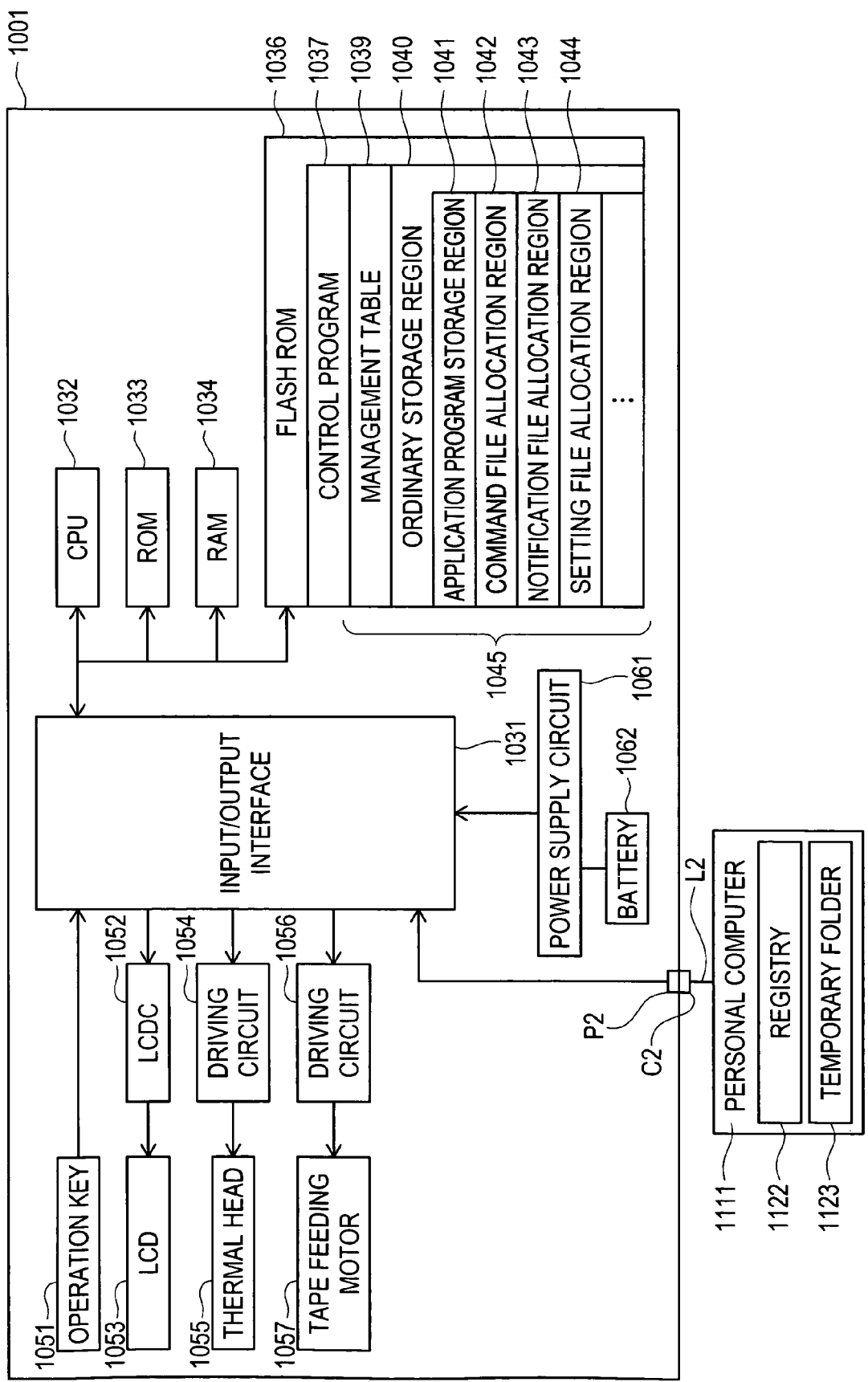
FIG. 10 is a block diagram showing an internal configuration of the printer.

The personal computer 1111 is provided with a registry 1122, a temporary folder 1123, as shown in FIG. 10 to be later described.

[2-2 Internal Configuration of the Second Embodiment]

The internal configuration of the printer 1 of the second embodiment is described with reference to FIG. 10. FIG. 10 is a block diagram showing the internal configuration of the printer 1001 of the second embodiment.

As shown in FIG. 10, the printer 1001 of the second embodiment includes an operation key 1051, a display controller (hereinafter, referred to as a LCDC) 1052, two driving circuits 1054 and 1056, a USB port P2, a power supply circuit 1061 and others, each connected to an input/output interface 1031.

The operation key 1051 is operated by a user to input control signals for causing various desired operations to a CPU 1032. The LCDC 1052 has a LCD 1053 connected thereto, and this LCD 1053 is provided with a display RAM for displaying display data. The driving circuit 1054 is connected to a thermal head 1055, and drives the thermal head 1055 when printing print data on a printing tape 1002. The driving circuit 1056 is connected to a tape feeding motor 1057, and drives this tape feeding motor 1057 when discharging the printing tape 1002 to the outside.

A connector C2 of the USB cable L2 is attached to and detached from the USB port P2. When the connector C2 of the USB cable L2 is inserted into this USB port P2, the personal computer 1111 can be connected to the printer 1001 of the second embodiment by USB connection.

A battery 1062 is connected to the power supply circuit 1061. The power supply circuit 1061 is a power supply circuit with on-off functions. The battery 1062 is a power source of the printer 1001 of the second embodiment. The CPU 1032 constantly monitors the remaining charge of the battery 1062 through A/D inputs. When the remaining charge of the battery 1062 becomes lower than a predetermined level, the CPU 1032 starts an automatic power-off process. When a first predetermined time has lapsed from the start of the power-off process, the CPU 1032 turns the power supply circuit 1061 off, and the power supply from the battery 1062 to peripheral circuits is turned off. However, the CPU 1032, the ROM 1033 and the RAM 1034 are still powered, and enter a sleep mode. The next holding-down of the power key of the printer 1001 causes interruption, activates the CPU 1032 and turns the power supply circuit 1061 on.

In the printer 1001 of the second embodiment, the CPU 1032, a ROM 1033, a RAM 1034, a FLASH ROM 1036 and others are connected to the input/output interface 1031.

The CPU 1032 is for executing the programs and others to be later described, and includes a built-in cache memory and others in which control programs other than those for printing are stored.

By executing a control program 1037 to be later described, the CPU 1032 can operate the driving circuits 1054 and 1056 to discharge the printing tape 1002 to the outside while printing on the printing tape 1002 the print data stored in an ordinary storage region 1040 to be later described. The two driving circuits 1054 and 1056, the thermal head 1055, the tape feeding motor 1057 and others constitute "a printing device".

The ROM 1033 stores control programs other than those for printing. The RAM 1034 provides a working region when executing various control programs by the CPU 1032.

The FLASH ROM 1036 stores the control program 1037 relating to printing, a management table 1039 and others, and is further provided with the ordinary storage region 1040 and others. In addition, the ordinary storage region 1040 is provided with an application program storage region 1041, a command file allocation region 1042, a notification file allocation region 1043, a setting file allocation region 1044 and others.

The management table 1039 manages the writing into the ordinary storage region 1040 in the FLASH ROM 1036 by a USB standard, and causes the personal computer 1111 connected to the USB port P2 to recognize the ordinary storage region 1040 in the FLASH ROM 1036 as a removable drive.

The application program storage region 1041 is a portion of the ordinary storage region 1040 in the FLASH ROM 1036 fixedly assigned, storing an execution file 1200 of the application program (see FIG. 8 to be later described). The application program here indicates software developed as a special editor for the printer 1001 according to the second embodiment.

The command file allocation region 1042 is a portion of the ordinary storage region 1040 in the FLASH ROM 1036 assigned by the management table 1039, storing a command file 1202 (see FIG. 8 to be later described). The command file 1202 (see FIG. 8 to be later described) here is created by the above application program, includes a print command, and further, includes print data created by the above application program.

The notification file allocation region 1043 is a portion of the ordinary storage region 1040 in the FLASH ROM 1036 assigned by the management table 1039, storing a notification file 1203 (see FIG. 8 to be later described). The notification file 1203 (see FIG. 8 to be later described) includes status information of the printer 1001 of the second embodiment.

The setting file allocation region 1044 is a portion of the ordinary storage region 1040 in the FLASH ROM 1036 assigned by the management table 1039, storing a setting file 1201 (see FIG. 8 to be later described). The setting file 1201 (see FIG. 8 to be later described) is created by the above application program and includes setting information showing the usage environment set by the user in the above application program.

Therefore, in the FLASH ROM 1036, the management table 1039 and the ordinary storage region 1040 function as a mass storage area 1045 of the USB standard.

[2-3 Operation of the Second Embodiment (1)]

Next, operations of the printer 1001 of the second embodiment will now be described referring to FIG. 8. FIG. 8 is a flowchart illustrating a program controlling operations of the printer 1001 of the second embodiment in accordance with operations of the personal computer 1111. First, the operations of the personal computer 1111 will be described.

As described above, when USB-connected to the printer 1001 of the second embodiment, the personal computer 1111 recognizes the ordinary storage region 1040 in the FLASH ROM 1036 of the printer 1001 of the second embodiment as a removable drive.

Then, in the personal computer 1111 at S1010, a user accesses, by a usual operation, the application program storage region 1041, which is an assigned portion of the ordinary storage region 1040 in the FLASH ROM 1036 of the printer 1001 of the second embodiment, and the execution file 1200 of the application program stored in the application program storage region 1041 is reads and activated.

Further, at S1011, in the personal computer 1111, the following operation is executed by the application program. That is, the setting file 1201 is read from the setting file allocation region 1044 which is an assigned portion of the ordinary storage region 1040 in the FLASH ROM 1036 of the printer 1001 of the second embodiment. The usage environment, etc. of the application program are set based on the setting information of the application program included in the read setting file 1201.

In the personal computer 1111, at S1012, the user creates print data to be printed at the printer 1001 of the second embodiment, using the special editor which is the application program.

At S1013, the personal computer 1111 determines whether to terminate the application program or not. This determination is done based on an input of the user at the application program. Here, if it is determined to terminate the application program (S1013: YES), the process shifts to S1019 to be later described. If it is determined to continue the application program (S1013: NO), the process shifts to S1014.

At S1014, the personal computer 1111 determines whether to allow the printer 1001 of the second embodiment to print or not. This determination is also done based on an input of the user at the application program. Here, if it is determined not to allow the printer 1001 of the second embodiment to print yet (S1014: NO), the process returns to the above S1012. If it is determined to allow the printer 1001 of the second embodiment to print (S1014: YES), the process shifts to S1015.

At S1015, the personal computer 1111 executes the following operations by the application program. That is, the personal computer 1111 creates the command file 1202 which includes a print command to the printer 1001 of the second embodiment, print data created by the application program, etc. Further, the personal computer 1111 transmits the created command file 1202 to the printer 1001 of the second embodiment.

At S1016, the personal computer 1111 executes the following operation by the application program. That is, the personal computer 1111 reads the notification file 1203 from the notification file allocation region 1043 which is an assigned portion of the ordinary storage region 1040 in the FLASH ROM 1036 of the printer 1001 of the second embodiment. Then the process shifts to S1016-2.

At S1016-2, it is determined whether the notification file 1203 includes status information of a printing error or not. Here, if the status information of the printing error is included in the notification file 1203 (S1016-2: YES), the process shifts to S1016-3. At S1016-3, the printing error is displayed at LCD 1053. After that, the process shifts to S1018 below.

If the notification file 1203 includes no status information of a printing error (S1016-2: NO), the process shifts to S1017.

At S1017, the personal computer 1111 executes the following operation by the application program. That is, the personal computer 1111 determines whether or not the printer 1001 of the second embodiment has finished printing the print data included in the command file 1202 transmitted at the above S1015. This determination is done based on the status of the printer 1001 of the second embodiment detected from the status information included in the notification file 1203 which is read at the above S1016. Here, if the printing has not been finished (S1017: NO), the process returns to the above S1016. If the printing has been finished (S1017: YES), the process shifts to S1018.

At S1018, the personal computer 1111 determines whether to continue the application program or not. This determination is done based on an input by the user at the application program. Here, if it is determined to continue the application program (S1018: YES), the process returns to the above S1012. If it is determined to terminate the application program (S1018: NO), the process shifts to S1019.

At S1019, the personal computer 1111 executes the following operations by the application program. That is, the personal computer 1111 creates the setting file 1201 which includes setting information showing the usage environment of the application set by the user while the application is activated, etc. Further, the personal computer 1111 transmits the created setting file 1201 to the printer 1001 of the second embodiment.

At S1020, the personal computer 1111 terminates the application program, and deletes the application program. As a result, the application program does not remain in the personal computer 1111.

Meanwhile, a program controlling the operations of S1101 to S1108 is executed at the printer 1001 of the second embodiment when USB-connected to the personal computer 1111. The program is stored in the ROM 1033, and the CPU 1032 reads the program into a cache memory therein to execute.

First, at S1101, the CPU 1032 determines whether or not the command file 1202 is received from the personal computer 1111. Here, if the command file 1202 has not been received from the personal computer 1111 (S1101: NO), the process shifts to S1107 to be later described. If the command file 1202 has been received from the personal computer 1111 (S1101: YES), the process shifts to S1102.

At S1102, the CPU 1032 overwrites and stores the command file 1202 onto the command file allocation region 1042 which is an assigned portion of the ordinary storage region 1040 in the FLASH ROM 1036.

At S1103, the CPU 1032 analyzes the command file 1202 overwritten on the command file allocation region 1042 which is an assigned portion of the ordinary storage region 1040 in the FLASH ROM 1036. The print data included in the command file 1202 is taken out by this analysis.

At S1104, the CPU 1032 executes printing of the print data taken out from the command file 1202 at the above S1103 in accordance with the control program 1037 relating to printing stored in the FLASH ROM 1036. Here, the CPU 1032 activates the driving circuits 1054, 1056 and others.

At S1105, the CPU 1032 creates the notification file 1203 which includes status information showing the current printing status and overwrites and stores the created notification file 1203 on the notification file allocation region 1043 which is an assigned portion of the ordinary storage region 1040 in the FLASH ROM 1036.

At S1106, the CPU 1032 determines whether the printing is finished or not. Here, if the printing is not yet finished (S1106: NO), the process shifts to the above S1105. If the printing is finished (S1106: YES), the process shifts to S1107.

At S1107, the CPU 1032 determines whether the setting file 1201 is received or not from the personal computer 1111. Here, if the setting file 1201 has not been received from the personal computer 1111 (S1107: NO), the process returns to the above S1101. If the setting file 1201 has been received from the personal computer 1111 (S1107: YES), the process shifts to S1108.

At S1108, the CPU 1032 overwrites and stores the setting file 1201 on the setting file allocation region 1044 which is an assigned portion of the ordinary storage region 1040 in the FLASH ROM 1036. After that, the CPU 1032 terminates the present program.

[2-4 Operation of the Second Embodiment (2)]

Figure 8:
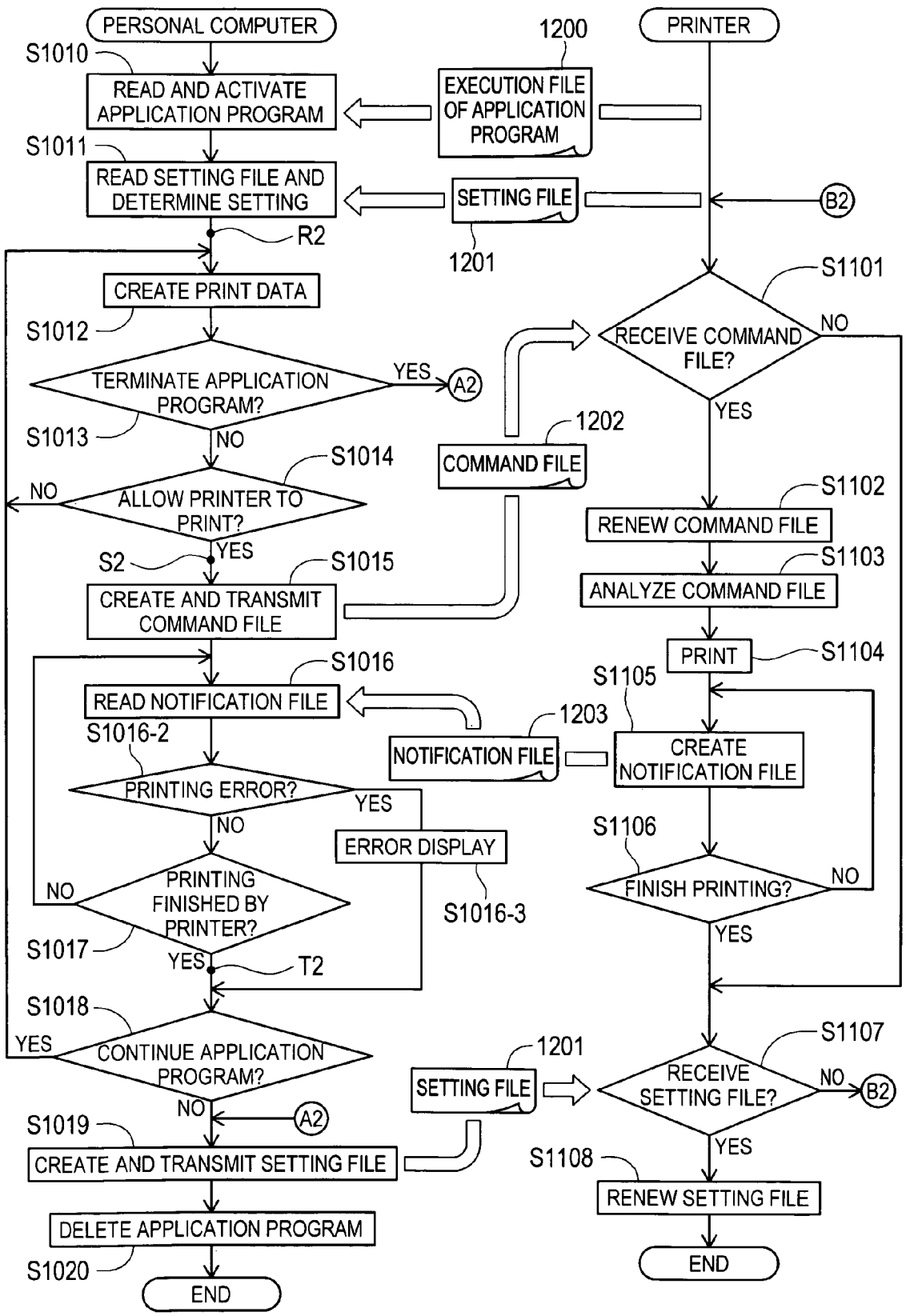
FIG. 8 is a flowchart illustrating al program controlling operations of a printer of the second embodiment in accordance with operations of a personal computer.
Figure 15:
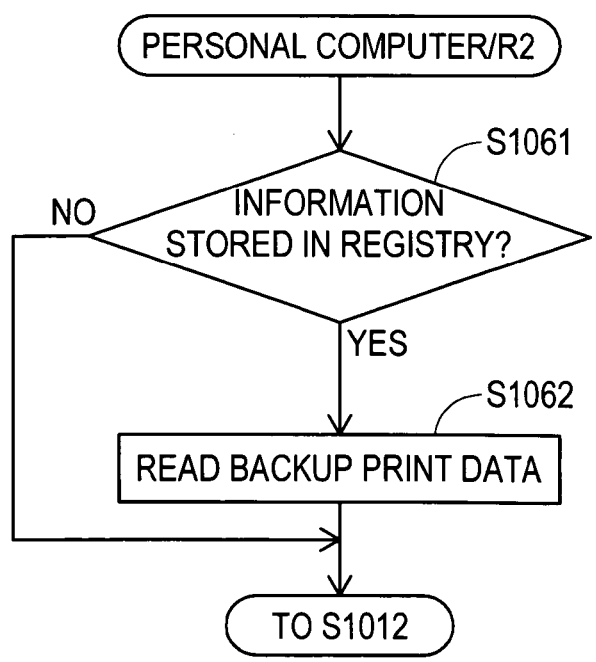
FIG. 15 is a flowchart illustrating a program controlling operations of the personal computer.

In the personal computer 1111, operations illustrated in FIG. 15 are executed at R2, the point immediately after the above S1011 of FIG. 8. FIG. 15 is a flowchart illustrating a program controlling operations of the personal computer 1111.

At S1061 of FIG. 15, the personal computer 1111 executes the following operations by the application program. That is, the personal computer 1111 determines whether or not information to be read at next start, to be later described, is stored in the registry 1122. If the information to be read at next start is not stored in the registry 1122 (S1061: NO), the process shifts to S1012 of FIG. 8. If the information to be read at next start is stored in the registry 1122 (S1061: YES), the process shifts to S1062.

At S1062, the personal computer 1111 executes the following operations by the application program. That is, the personal computer 1111 reads backup print data to be later described from the temporary folder 1123. The read backup print data is reconstructed by the special editor which is the application program. After that, the process shifts to the above S1012 of FIG. 8.

Figure 16:
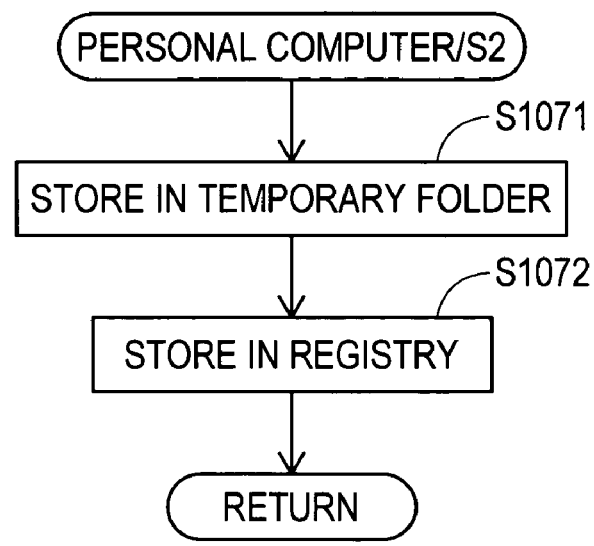
FIG. 16 is a flowchart illustrating a program controlling operations of the personal computer.

Also, in the personal computer 1111, operations illustrated in FIG. 16 are executed at S2, the point immediately before the above S1015 of FIG. 8. FIG. 16 is a flowchart illustrating a program controlling operations of the personal computer 1111.

At S1071 of FIG. 16, the personal computer 1111 executes the following operations by the application program. That is, the personal computer 1111 stores, as backup print data, print data created with the application program in the temporary folder 1123. Then, the process shifts to S1072.

At S1072, the personal computer 1111 executes the following operations by the application program. That is, the personal computer 1111 stores the information to be read at next start in the registry 1122. The information to be read at next start includes a control command to read the backup print data from the temporary folder 1123 when the application program is read and executed by the personal computer 1111 next time. Accordingly, if the information to be read at next start is stored in the registry 1122 when the application program is read and executed by the personal computer 1111 next time, the backup print data is set to be read from the temporary folder 1123. After that, the process shifts to the above S1015 of FIG. 8.

Figure 17:
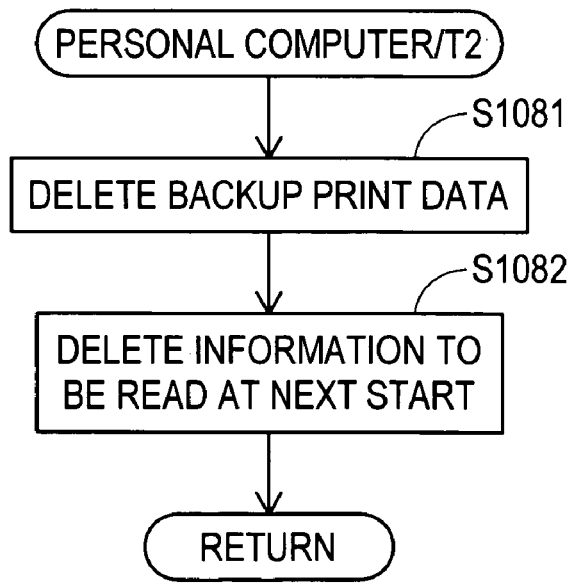
FIG. 17 is a flowchart illustrating a program controlling operations of the personal computer.

Also, in the personal computer 1111, operations illustrated in FIG. 17 are executed at T2, the point immediately after the above S1017 of FIG. 8. FIG. 17 is a flowchart illustrating a program controlling operations of the personal computer 1111.

At S1081 of FIG. 17, the personal computer 1111 executes the following operations by the application program. That is, the personal computer 1111 deletes the backup print data from the temporary folder 1123. Then, the process shifts to S1082.

At S1082, the personal computer 1111 executes the following operations by the application program. That is, the personal computer 1111 deletes the information to be read at next start from the registry 1122. Then, the process shifts to the above S1018 of FIG. 8.

[2-5 Operation of the Second Embodiment (3)]

Figure 11:
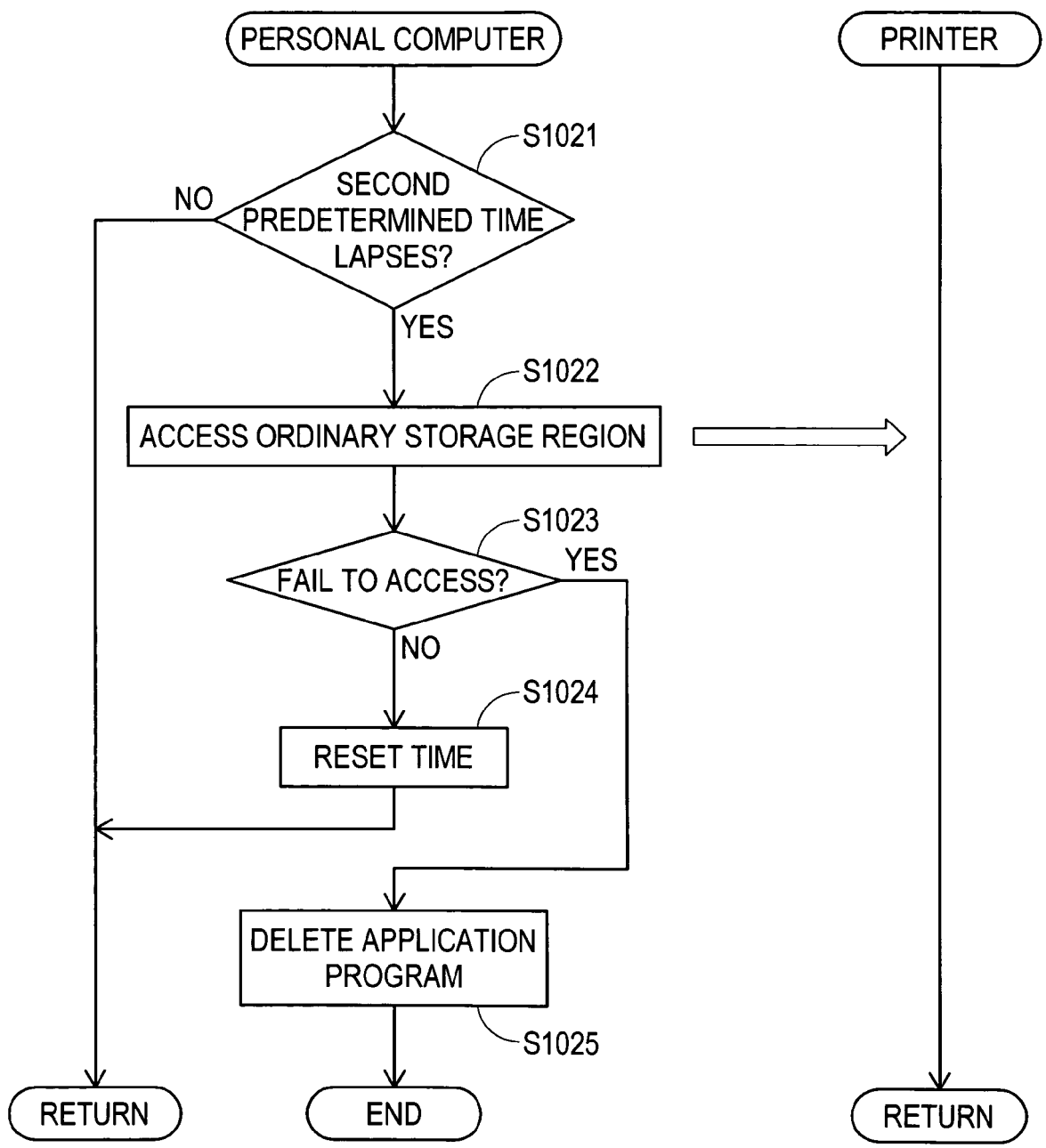
FIG. 11 is a flowchart illustrating al program controlling operations of the personal computer in accordance with operations of the printer.

FIG. 11 is a flowchart illustrating a program controlling operations of the personal computer 1111 in accordance with the operation of the printer 1001 of the second embodiment. This program is executed by the application program as periodic interruption processing in a certain point within S1010 through S1018 of the above FIG. 8.

At S1021 of the FIG. 11, the personal computer 1111 executes the following operations by the application program. That is, the personal computer 1111 determines whether a second predetermined time has lapsed or not. Only if the second predetermined time has lapsed (S1021: YES), the process shifts to S1022.

At S1022, the personal computer 1111 executes the following operations by the application program. That is, the personal computer 1111 tries to access the ordinary storage region 1040 in the FLASH ROM 1036 of the printer 1001 of the second embodiment, and tries to access any of the files stored in the ordinary storage region 1040. Then, the process shifts to S1023.

At S1023, the personal computer 1111 executes the following operations by the application program. That is, the personal computer 1111 determines whether the access at the above S1022 has failed or not. In this determination process, it is determined that the access of the above S1022 has failed if the personal computer 1111 could not get access at the above S1022, and it is determined that the access of the above S1022 has not failed if the personal computer 1111 could get access at the above S1022.

Here, when it is determined that the access at the above S1022 has not failed (S1023: NO), the process shifts to S1024. At S1024, the personal computer 1111 executes the following operations by the application program. That is, the personal computer 1111 resets the time of the determination target of the above S1021, and restarts the measurement of the time of the determination target of the above S1021. The measurement of the time of the determination target of the above S1021 is started when the execution file 1200 of the application program is activated at the above S1010.

Meanwhile, when it is determined that the access of the above S1022 has failed (S1023: YES), the process shifts to S1025. At S1025, the personal computer 1111 terminates the application program, and deletes the application program. Accordingly, the application program does not remain in the personal computer 1111.

[2-6 Operation of the Second Embodiment (4)]

Figure 12:
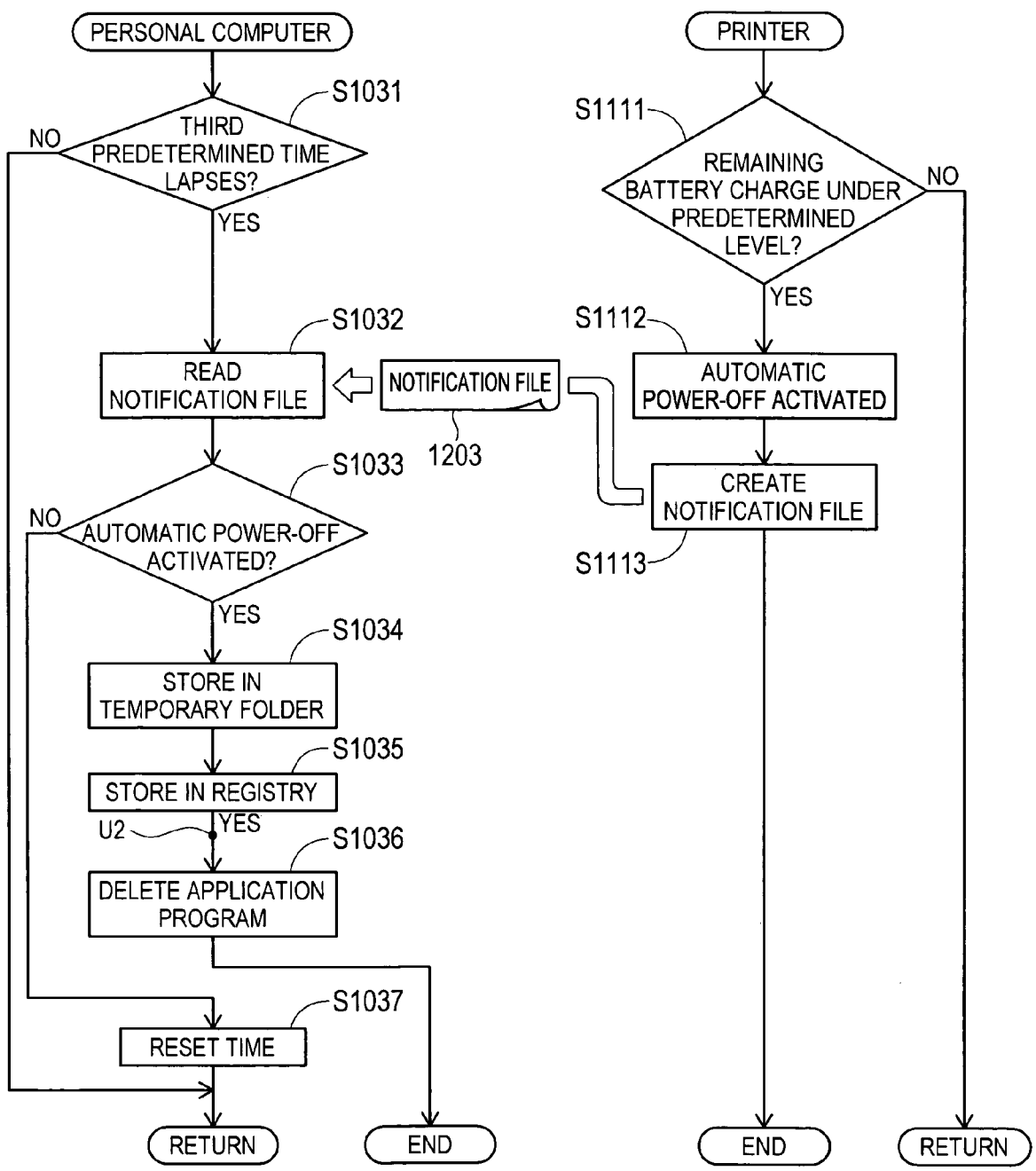
FIG. 12 is a flowchart illustrating a program controlling operations of the personal computer in accordance with operations of the printer.

FIG. 12 is a flowchart illustrating a program controlling operations of the personal computer 1111 in accordance with the operations of the printer 1001 of the second embodiment. Within this program, the part related to the operations of the personal computer 1111 is executed by the application program as periodic interruption processing in a certain point within S1010 through S1018 of the above FIG. 8. Also, within this program, the part related to the operations of the printer 1001 of the second embodiment is executed as periodic interruption processing in a certain point to the above S1108 of FIG. 8.

First, the operation of the printer 1001 of the second embodiment will now be described. At S1111 of FIG. 12, the CPU 1032 determines whether or not the remaining charge of the battery 1062 is lower than the predetermined level. This determination is done based on the remaining charge of the battery 1062 monitored by the CPU 1032. Here, only if the remaining charge of the battery 1062 is lower than the predetermined level (S1111: YES), the process shifts to S1112.

At S1112, the CPU 1032 starts an automatic power-off process. After that the process shifts to S1113.

At S1113, the CPU 1032 creates a notification file 1023 including status information showing the automatic power-off process has been started, and overwrites and stores the created notification file 1203 onto the notification file allocation region 1043 which is an assigned portion of the ordinary storage region 1040 in the FLASH ROM 1036.

At S1031, the personal computer 1111 executes the following operations by the application program. That is, the personal computer 1111 determines whether or not a third predetermined time has lapsed. Here, only if the third predetermined time has lapsed (S1031: YES), the process shifts to S1032.

At S1032, the personal computer 1111 executes the following operations by the application program. That is, the personal computer 1111 reads the notification file 1203 from the notification file allocation region 1043 which is an assigned portion of the ordinary storage region 1040 in the FLASH ROM 1036 of the printer 1001 of the second embodiment. Then the process shifts to S1033.

At S1033, the personal computer 1111 executes the following operations by the application program. That is, the personal computer 1111 determines whether or not the notification file 1203 includes the status information showing that the automatic power-off has been started. If the notification file 1203 does not include the status information showing that the automatic power-off has been started (S1033: NO), the process shifts to S1037.

At S1037, the personal computer 1111 executes the following operations by the application program. That is, the personal computer 1111 resets the time of the determination target of the above S1031, and restarts the measurement of the time of the determination target of the above S1031. The measurement of the time of the determination target of the above S1031 is started when the execution file 1200 of the application program is activated at the above S1010.

If the notification file 1203 includes the status information showing that the automatic power-off has been started (S1033: YES), the process shifts to S1034. At S1034, the personal computer 1111 executes the following operations by the application program. That is, the personal computer 1111 stores the print data which is currently under creation by the application program in the temporary folder 1123 as backup print data. After that, the process shifts to S1035.

At S1035, the personal computer 1111 executes the following operations by the application program. That is, the personal computer 1111 stores the information to be read at next start in the registry 1122. Accordingly, when the application program is read and executed by the personal computer 1111 next time, the backup print data is set to be read from the temporary folder 1123 if the information to be read at next start is stored in the registry 1122. After that, the process shifts to S1036.

At S1036, the personal computer 1111 terminates the application program and deletes the application program. Accordingly, the application program does not remain in the personal computer 1111.

[2-7 Operation of the Second Embodiment (5)]

Figure 13:
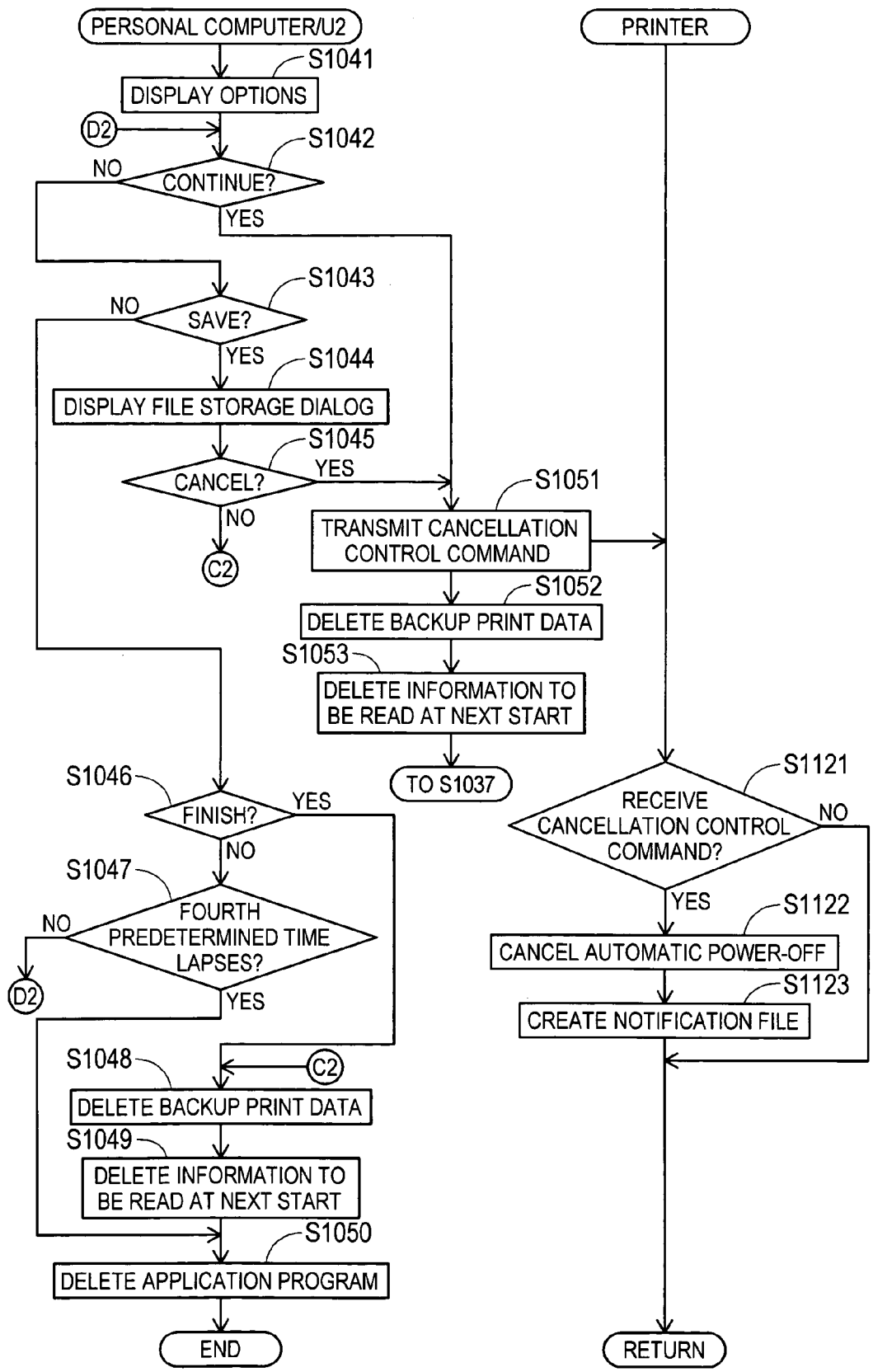
FIG. 13 is a flowchart illustrating a program controlling operations of the personal computer in accordance with operations of the printer.

Also, the personal computer 1111 executes the operations illustrated in FIG. 13 at U2, the point immediately after S1035 of the above FIG. 12. FIG. 13 is a flowchart illustrating a program controlling operations of the personal computer 1111 in accordance with the operations of the printer 1001 of the second embodiment.

Figure 14:
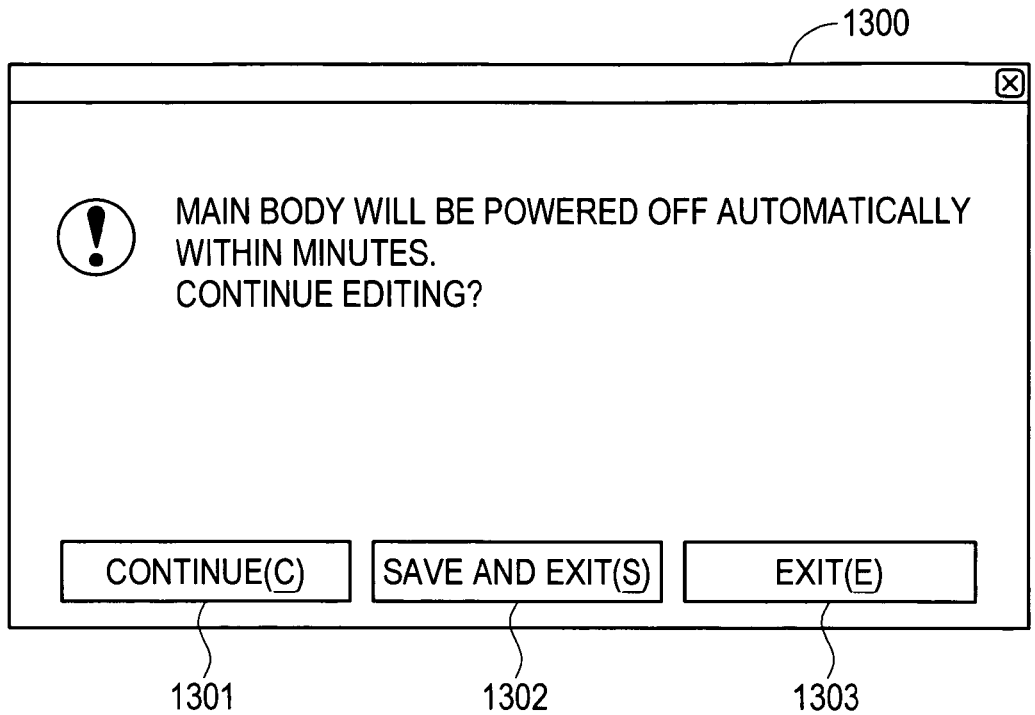
FIG. 14 is a view showing a window used at a special editor of the printer.

At S1041 of FIG. 13, the personal computer 1111 executes the following operations by the application program. That is, the personal computer 1111 displays options. More specifically, the personal computer 1111 displays on the display 1113 a window 1300 shown in FIG. 14. The window 1300 displays select buttons 1301, 1302, and 1303, which represent "CONTINUE", "SAVE AND EXIT" and "EXIT", respectively.

At S1042, the personal computer 1111 determines whether the user has selected the select button 1301 for "CONTINUE". This determination is done based on an input by the user at the application program.

Here, if the user has selected the select button 1301 for "CONTINUE" (S1042: YES), the process shifts to S1051 to be later described. If the user has not selected the select button 1301 for "CONTINUE" (S1042: NO), the process shifts to S1043. At S1043, the personal computer 1111 determines whether the user has selected the select button 1302 for "SAVE AND EXIT". This determination is done based on an input by the user at the application program.

Here, if the user has selected the select button 1302 for "SAVE AND EXIT" (S1043: YES), the process shifts to S1044. At S1044, the personal computer 1111 executes the following operations by the application program. That is, the personal computer 1111 displays a file save dialog on the display 1113. Accordingly, while making the user input the information necessary for saving a file, the personal computer 1111 can save the print data currently under creation by the application program. Then the process shifts to S1045.

At S1045, the personal computer 1111 determines whether the user has cancelled the file save dialog or not. This determination is done based on an input by the user at the application program. Here, if the user has not cancelled the file save dialog (S1045: NO), the process shifts to S1048 to be later described. If the user has cancelled the file save dialog (S1045: YES), the process shifts to S1051 to be later described.

Meanwhile, if the user has not selected the select button 1302 for "SAVE AND EXIT" (S1043: NO), the process shifts to S1046. At S1046, the personal computer 1111 determines whether or not the user has selected the select button 1303 for "EXIT". This determination is done based on an input by the user at the application program.

Here, if the user has selected the select button 1303 for "EXIT" (S1046: YES), the process shifts to S1048 to be later described. If the user has not selected the select button 1303 for "EXIT" (S1046: NO), the process shifts to S1047.

At S1047, the personal computer 1111 determines whether a fourth predetermined time has lapsed from the display of the options at the above S1041. The fourth predetermined time is set beforehand in a length in which the printer 1001 of the second embodiment is not powered off by the activation of the automatic power-off process of the above S1112 if the fourth predetermined time has lapsed from the display of options at the above S1041. Here, if the fourth predetermined time has not lapsed from the display of the options (S1047: NO), the process returns to the above S1042. If the fourth predetermined time has lapsed from the display of the options at the above S1041 (S1047: YES), the process shifts to S1050 to be later described.

Meanwhile, as above mentioned, if the user has not cancelled the file save dialog (S1045: NO), or if the user has selected the select button 1303 for "EXIT" (S1046: YES), the process shifts to S1048. At S1048, the personal computer 1111 executes the following operations by the application program. That is, the personal computer 1111 deletes the backup print data from the temporary folder 1123. Then the process shifts to S1049.

At S1049, the personal computer 1111 executes the following operations by the application program. That is, the personal computer 1111 deletes the information to be read at next start from the registry 1122. Then the process shifts to S1050.

At S1050, the personal computer 1111 terminates and deletes the application program. Accordingly, the application program does not remain in the personal computer 1111.

Meanwhile, as above mentioned, if the user has selected the select button 1301 for "CONTINUE" (S1042: YES), or if the user has cancelled the file save dialog (S1045: YES), the process shifts to S1051. At S1051, the personal computer 1111 executes the following operations by the application program. That is, the personal computer 1111 transmits a cancellation control command to the printer 1001 of the second embodiment. The cancellation control command is a command to cancel the automatic power-off process. Then the process shifts to S1052.

At S1052, the personal computer 1111 executes the following operations by the application program. That is, the personal computer 1111 deletes the backup print data from the temporary folder 1123. Then the process shifts to S1053.

At S1053, the personal computer 1111 executes the following operations by the application program. That is, the personal computer 1111 deletes the information to be read at next start from the registry 1122. Then the process shifts to the above S1037 of FIG. 12.

At the same time, in the printer 1001 of the second embodiment, the CPU 1032 determines whether the cancellation control command has been received or not, at S1121. Here, only if the cancellation control command has been received (S1121: YES), the process shifts to S1122. At S1122, the CPU 1032 makes the automatic power-off process cancelled. Then the process shifts to S1123.

At S1123, the CPU 1032 creates a notification file 1203 which includes status information showing that the automatic power-off process has been cancelled. Then the CPU 1032 overwrites and stores the created notification file 1203 in the notification file allocation region 1043 which is an assigned portion of the ordinary storage region 1040 in the FLASH ROM 1036.

[2-8 Summary]

As described above in detail, in the printer 1001 of the second embodiment, the management table 1039 which manages, with the USB standard, the writing into the ordinary storage region 1040 in the FLASH ROM 1036 is arranged outside the ordinary storage region 1040 in the FLASH ROM 1036 as shown in FIG. 10. With the management table 1039, the personal computer 1111 connected to the USB port P1 recognizes the printer 1001 of the second embodiment (specifically, the ordinary storage region 1040 in the FLASH ROM 1036 of the printer 1001 of the second embodiment) as a removable drive which is a USB mass storage class device.

Accordingly, with a usual access operation by a user at the personal computer 1111, the personal computer 1111 can read the execution file 1200 of the application program stored in the application program storage region 1041 which is a portion of the ordinary storage region 1040 in the FLASH ROM 1036 (S1010). This enables execution of the application program at the personal computer 1111 without installing the application program into the personal computer 1111 (S1010).

After that, the application program creates a command file 1202 which can include print data created by the application program on the personal computer 1111. The command file 1202 is then written onto the command file allocation region 1042 which is a portion of the ordinary storage region 1040 in the FLASH ROM 1036 with a usual access from the personal computer 1111 (S1015, S1102).

The CPU 1032 in turn takes out the print data in the command file 1202 written on the command file allocation region 1042 which is a portion of the ordinary storage region 1040 in the FLASH ROM 1036. The CPU 1032 discharges the print tape 1002 to the outside while printing the print data onto the print tape 1002 by activating the driving circuits 1054, 1056, etc. (S1104).

Here, upon receiving from the personal computer 1111 the command file 1202 which can include print data created by the application program on the personal computer 1111 (S1101: YES), the CPU 1032 overwrites the command file 1202 onto the command file allocation region 1042 which is a portion of the ordinary storage region 1040 in the FLASH ROM 1036 and renews it (S1102), then analyzes the renewed command file 1202 and takes out the print data (S1103). Accordingly, printing, using an application program can be carried out from the personal computer 1111 even if the application program and a device driver are not installed in the personal computer 1111.

Moreover, in the printer 1001 of the second embodiment, the notification file allocation region 1043 is assigned on a portion of the ordinary storage region 1040 in the FLASH ROM 1036 of the printer 1001 of the second embodiment which is recognized by the personal computer 1111 as a removable drive which is a USB mass storage class device. The notification file 1203 including therein the status information of the printer 1001 of the second embodiment is written on the notification file allocation region 1043. Accordingly, the personal computer 1111 can read the notification file 1203 written on the notification file allocation region 1043 which is a portion of the ordinary storage region 1040 in the FLASH ROM 1036 with a usual access from the personal computer 1111 (S1016). The personal computer 1111 is thus notified of the operational status of the printer 1001 of the second embodiment.

Further, in the second embodiment, when the application program is executed on the personal computer 1111 (S1010), periodic accesses are made to the ordinary storage region 1040 of the FLASH ROM 1036 of the printer 1001 of the second embodiment (S1022). If the access fails (S1023: YES), the application program terminates (S1025). Here, when the access failure occurs (S1023: YES), it is assumed, for example, that the USB cable L2 which connects the printer 1001 of the second embodiment is removed from the USB port P2, or the power is off at the printer 1001 of the second embodiment. Therefore, it can at least be said that it is difficult to guarantee the proper operation of the application program. Accordingly, in the second embodiment, the termination of the application program can be synchronized with the point when the printer 1001 of the second embodiment is disconnected with the personal computer 1111, or when the power is turned off at the printer 1001 of the second embodiment. As a result, the printer 1001 of the second embodiment can prevent the application program from operating when it is difficult to guarantee the proper operation of the application program.

Further, in the second embodiment, when the application program is executed on the personal computer 1111 (S1010), it is determined whether or not the notification file 1203 includes the status information showing that the automatic power-off process has been started (S1033) after the notification file 1203 including status information of the printer 1001 of the second embodiment is read (S1032), at the side of the personal computer 1111. Here, if the notification file 1203 includes the status information showing the automatic power-off process has been started (S1033: YES), the print data under creation by the application program is stored at the temporary folder 1123 as backup print data (S1034). Further, the information to be read at next start is stored at the registry 1122 (S1035).

Accordingly, in the second embodiment, when the application program is read and executed on the personal computer 1111 next time (S1010), the backup print data is also read from the temporary folder 1133 (S1062) according to the information to be read at next start stored at the registry 1122 (S1061: YES). Accordingly, if the power is automatically turned off during the creation of the print data by the application program, the print data being created immediately before the power-off can be reconstructed at the next start of the application program.

In addition, in the second embodiment, when the application program is executed on the personal computer 1111 (S1010), the window 1300 is displayed on the display 1113 (S1041) if the notification file 1203 includes status information showing that the automatic power-off process has been started (S1033: YES) when the notification file 1203 is read at the personal computer 1111 (S1032). The window 1300 includes select buttons 1301, 1302 and 1303, which represent "CONTINUE", "SAVE AND EXIT" and "EXIT", respectively. Here, the user can select one of the select buttons 1301, 1302 and 1303, which represent "CONTINUE", "SAVE AND EXIT" and "EXIT", respectively, at the personal computer 1111 before the power of the printer 1001 of the second embodiment is turned off (S1047: NO) with the automatic power-off process. If the user selects the select button 1301 for "CONTINUE" (S1042: YES), a cancellation control command to cancel the automatic power-off process is transmitted to the printer 1001 of the second embodiment (S1051). If the user selects the select button 1302 for "SAVE AND EXIT" (S1043: YES), the file save dialog is displayed on the display 1113 of the personal computer 1111 (S1044). If the user selects the select button 1303 for "EXIT" (S1046: YES), the application program is terminated (S1050). Accordingly, in the second embodiment, the user can determine whether to extend the print data creation by the application program before the power of the printer 1001 of the second embodiment is automatically turned off.

Further, in the second embodiment, if processes concerning the select buttons 1301, 1302 and 1303, which respectively represent "CONTINUE", "SAVE AND EXIT" and "EXIT", terminate normally on the personal computer 1111, the backup print data is deleted (S1048) from the temporary folder 1123, and also the information to be read at next start is deleted from the registry 1122 (S1049). Accordingly, if the processes concerning the select buttons 1301, 1302 and 1303, which respectively represent "CONTINUE", "SAVE AND EXIT" and "EXIT", terminate normally, no such inconvenience will occur as print data being created when the notification file 1203 is received (the data stored as backup print data at S1034) is reconstructed at the restart of the application program.

In addition, in the second embodiment, if the user cancels the file save dialog (S1045: YES) after selecting the select buttons 1302 for "SAVE AND EXIT" (S1043: YES) on the personal computer 1111, a cancel control command to cancel the automatic power-off process is transmitted to the printer 1001 of the second embodiment (S1051). Accordingly, the user can select the extension of the print data creation by the application program even after selecting the display of the file save dialog (S1043: YES) when the power is automatically turned off in the printer 1001 of the second embodiment.

Further, in the second embodiment, if the user select none of the select buttons 1301, 1302 and 1303, which respectively represent "CONTINUE", "SAVE AND EXIT" and "EXIT", on the personal computer 1111, and the fourth predetermined time has lapsed since the display of the select buttons 1301, 1302 and 1303 (S1047: YES), the application program is terminated (S1050) without the backup print data or the information to be read at next start being deleted, before the power supply is turned off from the battery 1062 in the printer 1001 of the second embodiment.

Here, in the printer 1001 of the second embodiment, as above mentioned, even if the power is automatically turned off while creating the print data by the application program, the backup print data can be read from the temporary folder 1133 (S1062) through the information to be read at next start stored at the registry 1122 (S1061: YES), when the application program is read and executed by the personal computer 1111 next time (S1010). Accordingly, the print data created immediately before the power-off can be reconstructed at the restart of the application program. Therefore, even if the user has not noticed of the select buttons 1301, 1302 and 1303, which respectively represent "CONTINUE", "SAVE AND EXIT" and "EXIT", and the power is automatically turned off, the print data being created immediately before the power-off can be reconstructed at the restart of the application program.

In addition, in the second embodiment, immediately before the command file 1202 with a print start command included therein is transmitted from the personal computer 1111 to the printer 1001 of the second embodiment (S1015), the print data under creation by the application program is stored at the temporary folder 1123 as the backup print data (S1071), and also the information to be read at next start is stored at the registry 1122 (S1072).

Accordingly, in the second embodiment, when the application program is read and executed next time by the personal computer 1111 (S1010), the backup print data is read from the temporary folder 1133 (S1062) according to the information to be read at next start stored in the registry 1122 (S1061: YES). Accordingly, even if the power is turned off while printing the print data at the printer 1001 of the second embodiment, the print data being created immediately before the power-off can be reconstructed at the restart of the application program.

Further, in the second embodiment, when the application program is executed on the personal computer 1111 (S1010), the notification file 1203 is read (S1016). The notification file 1203 includes the status information, from which the status of the printer 1001 of the second embodiment can be detected. On the personal computer 1111, it is determined, based on the status of the printer 1001 of the second embodiment, whether or not printing of the print data included in the command file 1202 transmitted at the above S1015 has been executed normally and has finished at the printer 1001 of the second embodiment. If it is determined the aforementioned printing has been executed normally and has finished thereat (S1017: YES), the backup print data is deleted from the temporary folder 1123 (S1081), and also the information to be read at next start is deleted from the registry 1122. Accordingly, if the print data is printed normally at the printer 1001 of the second embodiment, no such inconvenience will occur as print data having been printed normally (the data stored as backup print data at S1071) is reconstructed at the restart of the application program when the application program is read and executed next time by the personal computer 1111.

[2-9 Others]

The disclosure is not limited to the foregoing embodiment alone, but may be changed and modified within a scope not departing from the true spirit thereof.

For example, the printer 1001 of the second embodiment is what is called a label printer for printing on the printing tape 1002, but it may also be substituted by a printer for printing on roll or sheet printing paper.

In addition, whether to read or not to read the backup print data from the temporary folder 1123 may be determined based on the existence or nonexistence of the backup print data stored at the temporary folder 1123, instead of information to be read at next start stored in the registry 1122, when the application program is read and executed by the personal computer 1111 next time.

The personal computer 1111 connected to the printer 1001 of the second embodiment by way of the USB port P2 is not particularly specified, and may include tower type, all-in-one type, notebook type personal computer or huge computer, or it may be connected to another personal computer by LAN or the like.

While the presently exemplary embodiment has been shown and described, it is to be understood that this disclosure is for the purpose of illustration and that various changes and modification may be made without departing from the scope of the disclosure as set forth in the appended claims.

What is claimed is:

1. A printer comprising first and second memory regions, and further comprising:
   a USB port;
   a memory comprising an ordinary storage region;
   a management table arranged outside the ordinary storage region of the memory, the management table for making a personal computer connected to the USB port recognize the ordinary storage region in the memory as a removable drive while managing an access to the ordinary storage region in the memory by the personal computer;
   the first memory region being a portion of the ordinary storage region in the memory assigned by the management table and storing an execution file of an application program therein, the execution file of the application program being configured to be read and executed by the personal computer;

the second memory region being a portion of the ordinary storage region in the memory assigned by the management table and having a command file capable of including print data created by the application program written therein;

a printing device executing printing based on the print data in the command file written in the second memory region; and a processor controlling the printing device and the memory, wherein, the processor executes processes of:

(a) renewing the command file in the second memory region with a command file received; and (b) analyzing the command file currently renewed and taking out the print data, wherein, the personal computer comprises:
a temporary folder; and
a registry;

wherein, the printer further comprises:
a third memory region being a portion of the ordinary storage region in the memory assigned by the management table and having a notification file including status information of the printer written therein; and wherein, the processor executes an automatic power-off process for turning a power supply from a battery after a predetermined time period since remaining charge of the battery becomes lower than a predetermined level, and wherein, when the personal computer reads the execution file of the application program and executes the execution file thereon, after detecting the notification file, the application program executes processes of:

(1) determining whether or not the notification file includes information showing that the automatic power-off process has been started as the status information; and (2) if it is determined that the notification file includes the information showing that the automatic power-off process has been started:
 (2-1) storing the print data as backup print data in the temporary folder; and
 (2-2) storing in the registry information to be read at next start for reading the backup print data from the temporary folder when the personal computer reads and executes the application program next time.

2. The printer of claim 1,
wherein, the application program realizes the processes (1) through (2) by executing processes of:
(I) displaying options of "CONTINUE", "SAVE AND EXIT" and "EXIT" on the personal computer if it is determined that the notification file includes the information showing that the automatic power-off process has been started;
(II) transmitting a control command for canceling the automatic power-off process to the printer if it is determined that "CONTINUE" is selected among the options by a user;
(III) displaying a file save dialog on the personal computer if it is determined that "SAVE AND EXIT" is selected among the options by a user;
(IV) terminating the application program itself if it is determined "EXIT" is selected among the options by a user; and
(V) if the process with respect to the three options ends normally;
 (V-1) deleting backup print data from the temporary folder; and
 (V-2) deleting the information to be read at next start from the registry.

3. The printer of claim 2,
wherein, the application program executes processes of:
(VI) transmitting to the printer a control command for canceling the automatic power-off process if it is determined that the file save dialog is cancelled by the user after "SAVE AND EXIT" is selected among the options; and
(VII) terminating the application program itself immediately before power supply from the battery is turned off at the printer after the predetermined time period has lapsed from the process (I) without any of the options of "CONTINUE", "SAVE AND EXIT" and "EXIT" selected by the user.

4. The printer of claim 1,
wherein, the application program realizes the processes (1) through (2) by executing processes of:
(i) when transmitting the command file with a print start command included therein to the printer:
 (i-1) storing the print data as backup print data in the temporary folder; and
 (i-2) storing, in the registry, the information to be read at next start for reading the backup print data from the temporary folder when the personal computer reads and executes the application program next time; and
(ii) when receiving the notification file, if it is determined that the notification file includes, as the status information, information showing the printing by the print start command is executed normally with the printing device:
 (ii-1) deleting the backup print data from the temporary folder; and
 (ii-2) deleting the information to be read at next start from the registry.

5. A non-transitory computer-readable recording medium storing a control program of a printer,
wherein, the printer comprises:
a USB port;
the recording medium;
an ordinary storage region arranged in the recording medium;
a management table arranged outside the ordinary storage region of the recording medium, the management table for making a personal computer connected to the USB port recognize the ordinary storage region in the recording medium as a removable drive while managing an access to the ordinary storage region in the recording medium;
a first memory region being a portion of the ordinary storage region in the recording medium assigned by the management table and storing an execution file of an application program therein;
a second memory region being a portion of the ordinary storage region in the recording medium assigned by the management table and having a command file capable of including print data created by the application program written therein;
a printing device executing printing based on the print data in the command file written in the second memory region; and
a processor accessing the recording medium and controlling the printing device, wherein, the control program includes following instructions:
(a) instruction of renewing the command file in the second memory region with a command file received; and (b) instruction of analyzing the command file currently renewed and taking out the print data;

wherein, the personal computer comprises:

a temporary folder; and a registry;

wherein, the printer further comprises:

a third memory region being a portion of the ordinary storage region in the recording medium assigned by the management table and having a notification file including status information of the printer written therein; and wherein, the control program includes instruction of executing an automatic power-off process for turning a power supply from a battery after a predetermined time period since remaining charge of the battery becomes lower than a predetermined level, and wherein, the application program includes instruction of executing following instructions by the application program if the personal computer reads the execution file of the application program and executes the execution file thereon, after detecting the notification file:

(1) instruction of determining whether or not the notification file includes information showing that the automatic power-off process has been started as the status information; and (2) if it is determined that the notification file includes the information showing that the automatic power-off process has been started:

(2-1) instruction of storing the print data as backup print data in the temporary folder; and (2-2) instruction of storing in the registry information to be read at next start for reading the backup print data from the temporary folder when the personal computer reads and executes the application program next time.

6. The recording medium of claim 5, wherein, the application program includes instruction of realizing the instructions (1) through (2) by executing following instructions: (I) instruction of displaying options of "CONTINUE", "SAVE AND EXIT" and "EXIT" on the personal computer if it is determined that the notification file includes the information showing that the automatic power-off process has been started; (II) instruction of transmitting a control command for canceling the automatic power-off process to the printer if it is determined that "CONTINUE" is selected among the options by a user; (III) instruction of displaying a file save dialog on the personal computer if it is determined that "SAVE AND EXIT" is selected among the options by a user; (IV) instruction of terminating the application program itself if it is determined "EXIT" is selected among the options by a user; and (V) if the instruction with respect to the three options ends normally: (V-1) instruction of deleting backup print data from the temporary folder; and (V-2) instruction of deleting the information to be read at next start from the registry.

7. The recording medium of claim 6, wherein the application program includes instruction of executing following instructions: (VI) instruction of transmitting to the printer a control command for canceling the automatic power-off process if it is determined that the file save dialog is cancelled by the user after "SAVE AND EXIT" is selected among the options; and (VII) instruction of terminating the application program itself immediately before power supply from the battery is turned off at the printer after the predetermined time period has lapsed from the instructions (I) without any of the options of "CONTINUE", "SAVE AND EXIT" and "EXIT" selected by the user.

8. The recording medium of claim 5, wherein the application program includes instruction of realizing the instructions (1) through (2) by executing following instructions: (i) when transmitting the command file with a print start command included therein to the printer: (i-1) instruction of storing the print data as backup print data in the temporary folder; and (i-2) instruction of storing, in the registry, the information to be read at next start for reading the backup print data from the temporary folder when the personal computer reads and executes the application program next time; and (ii) when receiving the notification file, if it is determined that the notification file includes, as the status information, information showing the printing by the print start command is executed normally with the printing device: (ii-1) instruction of deleting the backup print data from the temporary folder; and (ii-2) instruction of deleting the information to be read at next start from the registry.

* * * * *